United States Patent
Hiruma

(10) Patent No.: US 10,618,169 B2
(45) Date of Patent: Apr. 14, 2020

(54) ROBOT

(71) Applicant: JANOME SEWING MACHINE CO., LTD., Tokyo (JP)

(72) Inventor: Kenichiro Hiruma, Tokyo (JP)

(73) Assignee: JANOME SEWING MACHINE CO., LTD., Tokyo (JP)

(*) Notice: Subject to any disclaimer, the term of this patent is extended or adjusted under 35 U.S.C. 154(b) by 267 days.

(21) Appl. No.: 14/809,694

(22) Filed: Jul. 27, 2015

(65) Prior Publication Data

US 2016/0214256 A1 Jul. 28, 2016

(30) Foreign Application Priority Data

Jan. 27, 2015 (JP) ................. 2015-013401

(51) Int. Cl.
*B25J 9/16* (2006.01)
*G05B 19/4155* (2006.01)

(52) U.S. Cl.
CPC ........ *B25J 9/1674* (2013.01); *G05B 19/4155* (2013.01); *G05B 2219/33297* (2013.01); *G05B 2219/50391* (2013.01); *Y10S 901/41* (2013.01); *Y10S 901/49* (2013.01)

(58) Field of Classification Search
CPC ............... B25J 9/1674; G05B 19/4155; G05B 2219/33297; G05B 2219/50391; Y10S 901/41; Y10S 901/49
See application file for complete search history.

(56) References Cited

U.S. PATENT DOCUMENTS

| | | | |
|---|---|---|---|
| 5,535,318 A * | 7/1996 | Motoyama | G06F 3/1297 715/210 |
| 5,949,683 A | 9/1999 | Akami et al. | |
| 6,166,505 A * | 12/2000 | Sato | B25J 9/1674 318/563 |
| 6,246,920 B1 * | 6/2001 | Mizuno | B23Q 17/00 700/105 |
| 6,445,979 B1 * | 9/2002 | Inoue | B25J 9/1684 318/565 |
| 2001/0011367 A1 | 8/2001 | Logan, III et al. | |

(Continued)

FOREIGN PATENT DOCUMENTS

| | | |
|---|---|---|
| CN | 1293606 A | 5/2001 |
| CN | 1876334 A | 12/2006 |

(Continued)

OTHER PUBLICATIONS

Office Action issued in corresponding German application No. 10 2015 214 045.8 dated Mar. 7, 2016.

(Continued)

*Primary Examiner* — Kenneth M Lo
*Assistant Examiner* — Mohammad A Rahman
(74) *Attorney, Agent, or Firm* — Nath, Goldberg & Meyer; Jerald L. Meyer

(57) ABSTRACT

A robot repeats successive works for each process point. A controller stores, in a storage, control data that arrays therein structural point blocks each bundling the successive works for each process point. The structural point block arrays therein point statements 8 indicating details of the successive works. A debugger executes step-over which sequentially executes the control data in a unit of structural point block, and which aborts the execution.

10 Claims, 21 Drawing Sheets

(56) References Cited

U.S. PATENT DOCUMENTS

| | | | |
|---|---|---|---|
| 2002/0038168 A1 | 3/2002 | Kasuga et al. | |
| 2004/0193293 A1 | 9/2004 | Watanabe et al. | |
| 2005/0027479 A1* | 2/2005 | Lee | B25J 9/1674 702/182 |
| 2006/0262547 A1* | 11/2006 | Strobl | F21V 17/007 362/408 |
| 2007/0078538 A1* | 4/2007 | Kawakami | G06F 11/3648 700/87 |
| 2007/0130572 A1* | 6/2007 | Gilbert | G06F 9/4488 719/318 |
| 2008/0134146 A1* | 6/2008 | Horn | G05B 19/056 717/124 |
| 2009/0132085 A1* | 5/2009 | Sjostrand | G05B 19/4063 700/245 |
| 2010/0036527 A1* | 2/2010 | Matsunaga | B25J 9/1676 700/264 |
| 2010/0186534 A1* | 7/2010 | Kinoshita | B25J 17/0266 74/490.06 |
| 2011/0256800 A1* | 10/2011 | Jennings | G01S 1/70 446/456 |
| 2013/0332908 A1* | 12/2013 | Stall | G06F 11/3636 717/125 |
| 2014/0124486 A1* | 5/2014 | Devers | B23K 26/0884 219/121.45 |
| 2014/0277729 A1* | 9/2014 | Nakamura | G01L 5/0076 700/258 |
| 2014/0285482 A1 | 9/2014 | Kim et al. | |
| 2015/0073594 A1* | 3/2015 | Trujillo | F24J 2/40 700/248 |
| 2015/0239127 A1* | 8/2015 | Barajas | B25J 9/1697 700/253 |
| 2015/0343635 A1* | 12/2015 | Linnell | B25J 9/1671 700/249 |

FOREIGN PATENT DOCUMENTS

| | | |
|---|---|---|
| CN | 101791797 A | 8/2010 |
| CN | 101970185 A | 2/2011 |
| CN | 102756372 A | 10/2012 |
| CN | 103302658 A | 9/2013 |
| CN | 104044147 A | 9/2014 |
| CN | 104793615 A | 7/2015 |
| DE | 69618606 T2 | 9/2002 |
| EP | 2902862 A1 | 8/2015 |
| JP | 277805 A | 3/1990 |
| JP | 4343689 A | 11/1992 |
| JP | 5-257522 A | 10/1993 |
| JP | 7-64619 A | 3/1995 |
| JP | 7200019 A | 8/1995 |
| JP | 11188686 A | 7/1999 |
| JP | 2005301365 A | 10/2005 |
| JP | 2007-102385 A | 4/2007 |
| JP | 2007102385 A | 4/2007 |
| JP | 2008524734 A | 7/2008 |
| JP | 4222828 B2 | 2/2009 |
| WO | 0216091 A1 | 2/2002 |

OTHER PUBLICATIONS

Chinese office action dated May 3, 2018 for corresponding application No. 201510266458.6 with English translation attached.

Japanese Office Action dated Jan. 8, 2019 corresponding to application No. 2015-013401.

* cited by examiner

| | | | | | | |
|---|---|---|---|---|---|---|
| CONTROL DATA | 81 | 82 | 83 | 84 | 85 | 86 |
| FIRST SUCCESSIVE WORKS | #1 | PTP AVOI-DANCE POINT | .. | .. | .. | .. |
| | #2 | PTP AVOI-DANCE POINT | .. | .. | .. | .. |
| | #3 | CP START POINT | X=100 Y=120 Z=50 | .. | .. | 4 |
| | #4 | CP PASSING POINT | .. | .. | .. | .. |
| | #5 | CP PASSING POINT | .. | .. | .. | .. |
| | #6 | CP END POINT | .. | .. | .. | .. |
| SECOND SUCCESSIVE WORKS | #7 | PTP AVOI-DANCE POINT | .. | .. | .. | .. |
| | #8 | PTP AVOI-DANCE POINT | .. | .. | .. | .. |
| | #9 | CP START POINT | X=100 Y=240 Z=50 | .. | .. | 4 |
| | #10 | CP PASSING POINT | .. | .. | .. | .. |
| | #11 | CP PASSING POINT | .. | .. | .. | .. |
| | #12 | CP PASSING POINT | .. | .. | .. | .. |
| | #13 | CP END POINT | .. | .. | .. | .. |

*FIG. 11*

ROBOT

CROSS-REFERENCE TO RELATED APPLICATION(S)

This application is based upon and claims the benefit of priority from Japan Patent Application No. 2015-013401, filed on Jan. 27, 2015, the entire contents of which are incorporated herein by reference.

FIELD OF THE INVENTION

The present invention relates to debugging on control data for a robot.

BACKGROUND

Industrial robots for various kinds of works to workpieces, such as screw tightening, welding, painting, carrying, attachment of a part, and soldering, include, for example, a vertical multi-joint type moving unit. A work tool attached to the moving unit is moved to a predetermined point and is driven by a computer that executes a control program.

The control program is described in a robot language, such as SLIM (Standard Language for Industrial Manipulators) or a super SEL language with instruction-based sentence structures including a control statement, a procedure, and a function. In addition, a point-based robot language has been also provided (see, for example, Japan Patent No. 4222828, JP H07-64619 A, and JP H05-257522 A) which controls a robot by referring to control data having a point number as a separator and also having information added to the portion following to the point number. Such information relates to a point where the work tool is to be positioned.

According to the point-based robot language, the point numbers are assigned to a start point for a main work where the original function of the work tool is accomplished, an end point of the main work, a routing point to position the work tool at the start point, and routing points from the start point to the end point, respectively, and pieces of information on those points are recorded in the control data.

Information on the point includes the kind of the point, the moving method to the point, the coordinates of the point, the details of work before the movement to the point, the details of work during the movement to the point, and the details of work at the point, etc., and a computer refers to those pieces of information, and successively executes an instruction set stored beforehand. That is, according to the point-based robot language, each point serves as a sort of sub-routine, and is arranged in the control data.

Regardless what language the control program is described, the control program is created together with code inputting through a keyboard or a GUI, and recording of a point and a posture through teaching. The procedure of programming includes a debug work which divides the control program, checks the operation of the robot for each separator while intermittently executing the program, and finds and corrects the control-data bug for each separator.

According to this debug work, step execution that executes the process step by step is known. By checking the instruction sentence by sentence, bugs can be carefully specified. Step-over execution that sequentially executes the contents in a sub-routine called a function block is also known (see, for example, JP H07-64619 A). Function blocks are often perfected already since it is quite cumbersome and is not efficient for a user to perform step execution in the function block and to give an instruction for restart every time the debug work is aborted.

The function block is one of structural elements of a program defined in IEC-61131-3, and is a sub-routine that can call a control realized by a combination of plural functions through only one instruction. As to the function block, the kinds of functions to be bundled are not defined, and in general, in view of the program development efficiency and the easiness to view, the function blocks are applied to enable the application of codes that are frequently used, and to make the complex structure be a function, thereby simplifying the program.

It is desirable that the debug work should be as efficient as possible. When paying an attention to a robot, the work tool often changes the process point and repeats the main work. Hence, as to the robot operation check in the debug work, it is sometimes efficient if the debug work is carried out in a unit of successive works from the positioning of the work tool at the start point while avoiding a physical contact through the routing points, the movement of the work tool from the start point to the end point while performing the main work, and the execution of a post-work process at the end point.

However, in the case of a control format that refers to the control data having point-based sentence structures recorded, according to conventional debug works, it is necessary to once stop the operation at each of plural routing points, position at the start point and once stop the operation, position at the end point and once stop the operation, and to wait for a restart instruction from the user between the stops. That is, successive works for a process point are divided into individual works.

In order to cause a robot to sequentially perform successive works, a user may set a break point in the control data. However, it takes a time to set the break point during the programming in consideration of a debug work, and is not efficient. In addition, setting a break point in the control data at the tentative completion of programming is not practical.

The present invention has been made in order to address the above-explained technical problems of conventional technologies, and it is an objective of the present invention to provide a robot that can improve the efficiency of a debug work for a control program which refers to control data recording point-based sentence structures.

SUMMARY OF THE INVENTION

To accomplish the above objective, a robot according to an aspect of the present invention repeats successive works for each process point, and the robot includes:

a work tool performing a main work on each process point in the successive works;

a moving unit moving the work tool in the successive works;

a controller controlling the work tool and the moving unit;

a storage storing control data arraying therein structural point blocks, each structural point blocks bundling the successive works for each process point; and a debugger sequentially executing the control data in a unit of structural point block, and aborting the execution.

The successive may works include the main work by the work tool, a pre-process work and a post-process work before and after the main work, and positioning to a plurality of points for the main work; and the structural point block may record data representing a work in the successive works and details of movement.

The structural point block may array therein point statements, the point statements each being data indicating all points for positioning during a set of the successive works and details of a work before, after, or during movement to the point; and the debugger may sequentially execute all point statements contained in the structural point block, and abort the sequential execution of the control data.

The structural point block may array therein:
a point statement that is data indicating all points for positioning during a set of the successive works; and
a work statement that is data indicating all works to be executed before, after, or during movement in the set of the successive works, and the debugger may sequentially execute all point statement and work statement contained in the structural point block, and abort the sequential execution of the control data.

The structural point block may record break point information; and the debugger may sequentially execute all structural point blocks up to the structural point block with the break point information, and abort the execution.

The storage may store a table that records break point information indicating the specific structural point block; and the debugger may sequentially execute all structural point blocks up to the structural point block indicated by the break point information, and abort the execution.

The robot may further include a console device that accepts a user's operation,
in which the debugger may include:
a step-over executer sequentially executing the control data in a unit of the structural point block and aborting in accordance with a selection of step-over execution through the console device; and
a step-in executer aligning an execution position with a header of contents of the structural point block and aborting in accordance with a selection of step-in execution through the console device, and intermittently executing statement by statement in response to a restart instruction given through the console device, and aborting the execution.

The debugger may further include a step-out executer sequentially executing all remaining statements in the structural point block in accordance with a selection of step-out execution through the console device after the selection of the step-in execution, stepping out from the structural point block, and aborting the execution.

The control data may record the nested structural point block; and
the debugger may include:
a nesting step-over executer sequentially executing all contents of the nested structural point block; and
a nesting step-in executer intermittently executing the contents of the nested structural point block statement by statement.

The debugger may further include a nesting step-out executer sequentially executing all remaining statements in the nested structural point block, stepping out from the nested structural point block, and aborting the execution.

The robot may further include a display displaying a tree view of a structure of the control data.

The controller may execute an initial process before referring to an array of the structural point blocks, and executes a last process after referring to the array of structural point blocks;

all of the structural point blocks may record:
an initial statement which is a single or plural sentences that are an instruction set or a call instruction thereof indicating details of the initial process; and
a last statement which is a single or plural sentences that are an instruction set or a call instruction thereof indicating details of the last process;

the controller may ignore the initial statement and the last statement; and the debugger may execute the initial statement and the last statement.

According to the present invention, the robot sequentially operates in a unit of successive works for each process point, and once stops. Hence, the efficiency of a debug work can be improved.

BRIEF DESCRIPTION OF THE DRAWINGS

FIG. 11 is an exemplary diagram illustrating control data according to a second embodiment;

DETAILED DESCRIPTION OF THE EMBODIMENTS

First Embodiment (Robot Structure)

Figure 1:
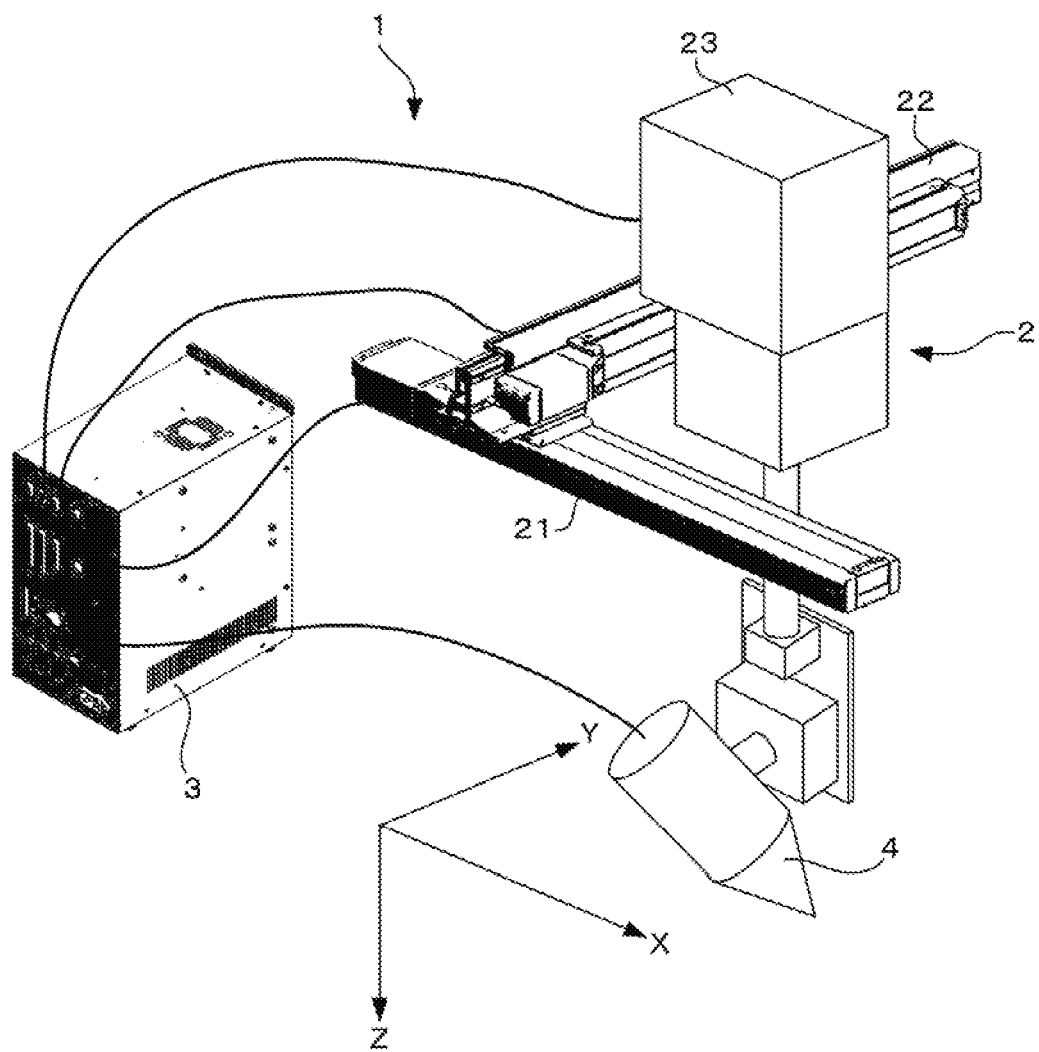
FIG. 1 is an exemplary diagram illustrating an entire structure of a robot.

A robot 1 according to a first embodiment of the present invention will be explained below in detail with reference to figures. FIG. 1 is a diagram illustrating an entire structure of the robot 1 of this embodiment. As illustrated in FIG. 1, the robot 1 includes a moving unit 2 and a controller 3. A work tool 4 is attached to the moving unit 2. This robot 1 controls the moving unit 2 and the work tool 4, positions the work tool 4 at a desired position, and causes the work tool 4 to perform a work. The work tool 4 is, for example, an electric screw-tightening driver, a welder, a painting gun, or a handler.

The moving unit 2 moves the work tool 4 in an X-axis direction, a Y-axis direction, and a Z-axis direction, and positions the work tool 4 at a designated point. The X-axis direction is an axial direction in parallel with the horizontal plane. The Y-axis direction is another axial direction which is in parallel with the horizontal plane but is orthogonal to the X-axis direction. The Z-axis direction is a height direction. This moving unit 2 includes an X linear slider 21 that moves the work tool 4 in the X-axis direction, a Y linear slider 22 that moves the work tool 4 in the Y-axis direction, and a Z linear slider 23 that moves the work tool 4 in the Z-axis direction.

The X linear slider 21 has the Y linear slider 22 provided slidably on a rail that extends in the X-axis direction, and has the Y linear slider 22 fastened with an endless belt that runs in the X-axis direction which is orthogonal to the Y linear slider 22. The endless belt is run by an X-axis motor to move the Y linear slider 22 along the X-axis direction.

The Y linear slider 22 has the Z linear slider 23 provided slidably on a rail that extends in the Y-axis direction, and has the Z linear slider 23 fastened with an endless belt that runs in the Y-axis direction. The endless belt is run by a Y-axis motor to move the Z linear slider 23 along the Y-axis direction. Example transmission mechanisms for the X and Y linear sliders 21, 22 are, in addition to endless belts, various actuators including a cylinder and a lead screw.

The Z linear slider 23 includes an arm with an axis that in parallel with the Z-axis direction, and the work tool 4 is attached to the leading end of this arm. This Z linear slider 23 includes, for example, a rack-and-pinion mechanism, has the rack elongated in the Z-axis direction, and has the arm fixed to this rack. The pinion is turned by a Z-axis motor to move the arm in the Z-axis direction. This Z linear slider 23 moves the work tool 4 in the Z-axis direction.

Figure 2:
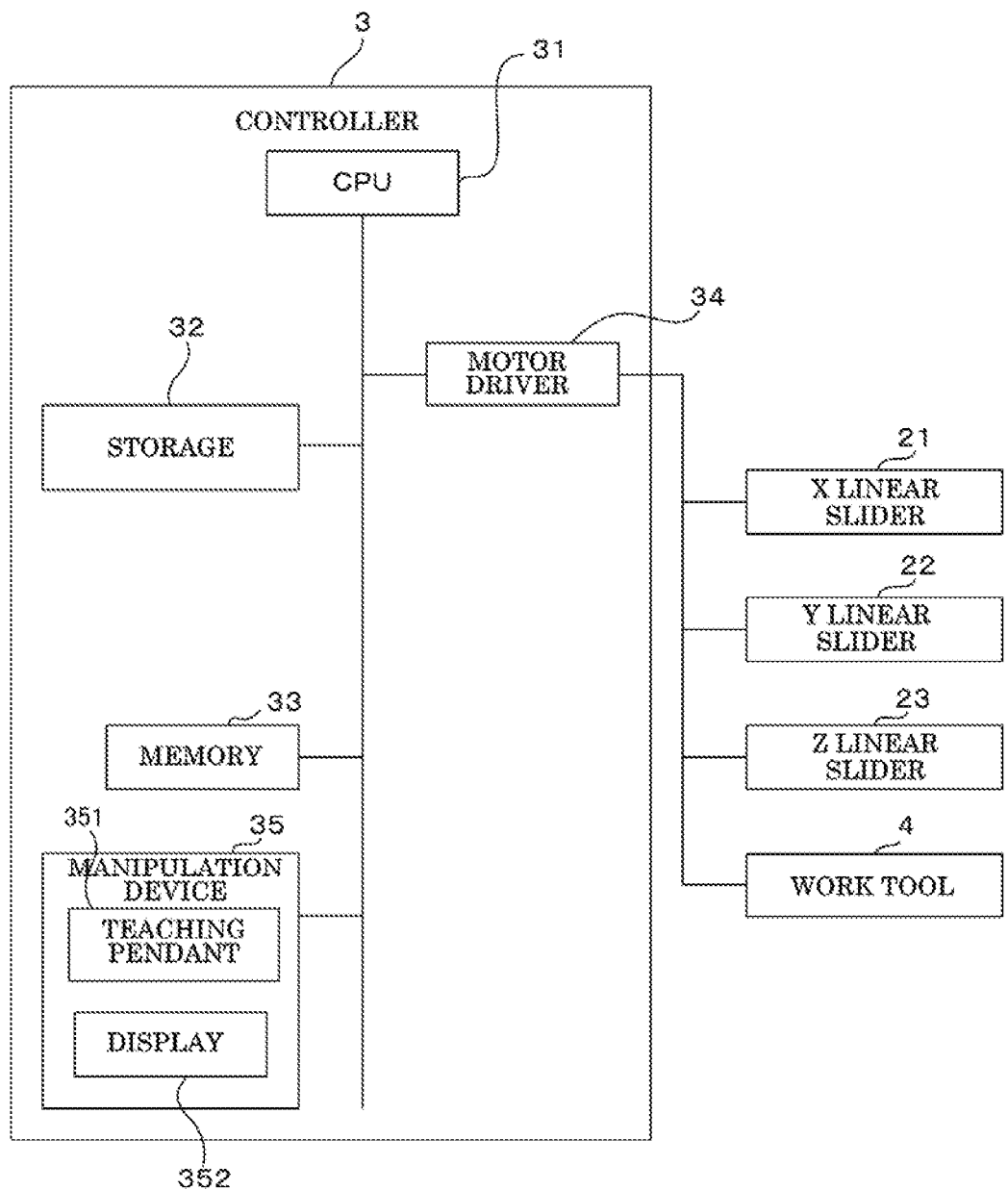
FIG. 2 is a block diagram illustrating a structure of a controller.

As illustrated in FIG. 2, the controller 3 is a so-called computer that includes a CPU 31 which executes an arithmetic processing and outputs instruction signals to peripheral devices in accordance with control data 6 that is a structural element of a so-called control program, a storage 32 like an HDD that stores the program, a memory 33 in which the program is expanded and which temporarily stores the arithmetic processing result by the CPU 31, and, the peripheral devices. The peripheral devices include a motor driver 34 that supplies power pulses to the respective motors in accordance with an instruction signal output by the CPU 31, and a console device 35 that includes a display 352 like a liquid crystal display, and a mouse, a keyboard, and a teaching pendant 351, etc.

Figure 3:
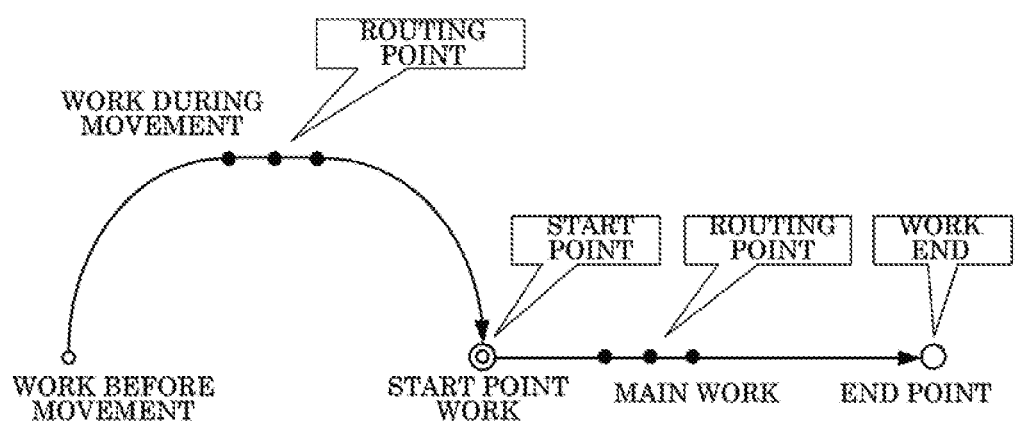
FIG. 3 is an exemplary diagram illustrating successive works to a process point.

This controller 3 controls the moving unit 2 and the work tool 4 upon the program process with reference to control data 6 in the storage 32. As illustrated in FIG. 3, the robot 1 moves the work tool 4 to the start point through, for example, three routing points under the control of the controller 3. Before this movement, a pre-process work is performed, and an in-movement work is also performed during the movement. When reaching the start point, the robot performs a start-point work at the start point. When the start-point work completes, the robot 1 moves the work tool 4 to the end point while starting a main work. When reaching the endpoint, the robot 1 performs an end-point work at the end point.

As is demonstrated by this example case, the robot 1 performs successive works to a process point under the control of the controller 3, and repeats the new successive works while changing the process point. The process point is a location where the main work is performed. The successive works include the main work to the process point, and associate works to complete the main work. The associated works include the movement to the start point for the main work, and pre-process work and post-process work before and after the main work.

The main work is, for example, screw tightening or welding that requires the work tool 4 to accomplish the original function. The pre-process work includes a work before the movement to the start point, a work during the movement, and a work before the main work at the start point. The movement includes a movement to the start point through routing points so as to avoid physical obstacles, and a movement from the start point to the end point of the main work. The post-process work is a work at the endpoint after the main work.

(Control Data Structure)

Figure 4:
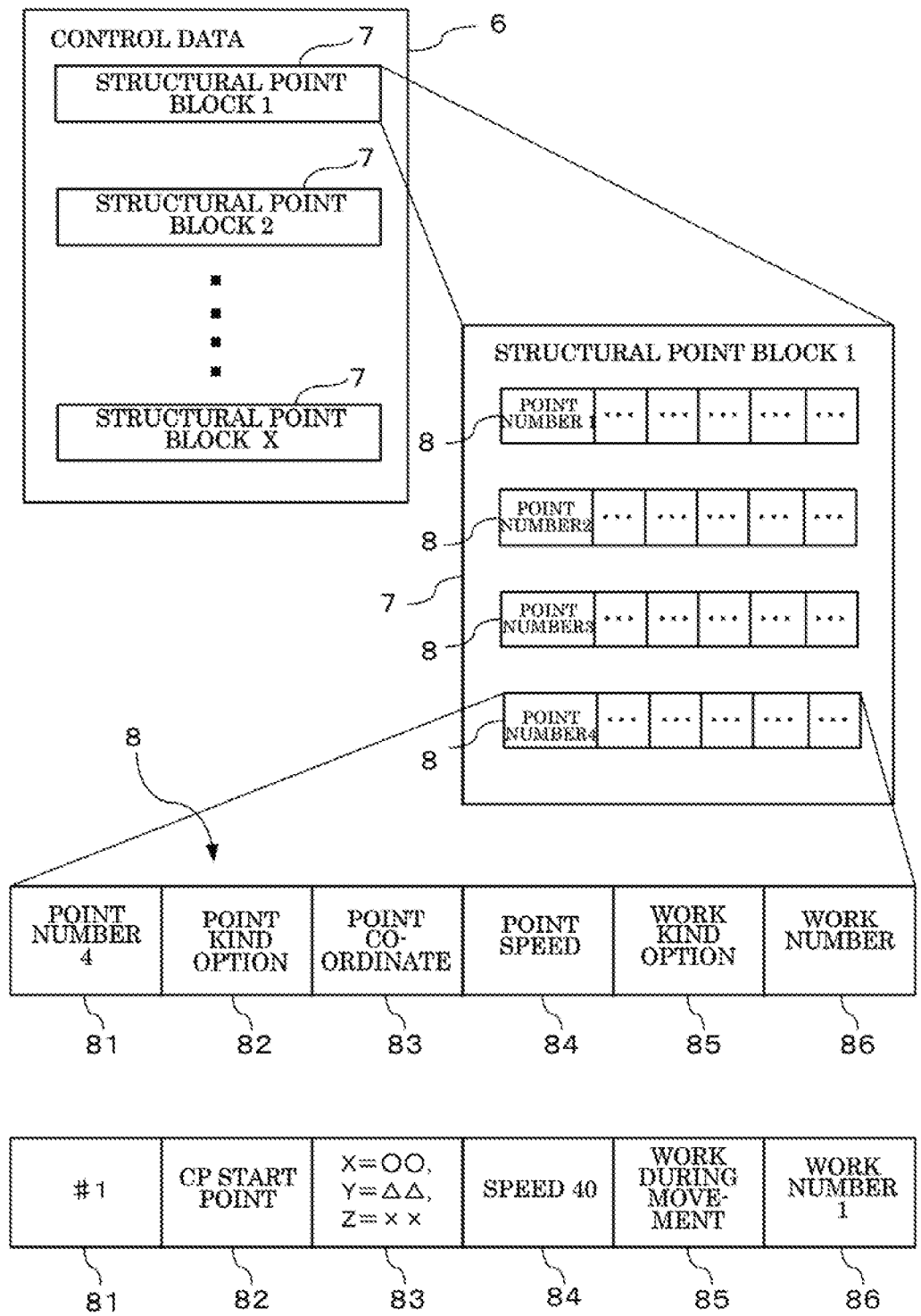
FIG. 4 is an exemplary diagram illustrating control data according to a first embodiment.

FIG. 4 is an exemplary diagram illustrating an entire structure of the control data 6. The control data 6 records successive works for each process point. This control data 6 has plural structural point blocks 7 arrayed therein. The structural point block 7 records a bundle of the successive works to a process point.

The successive works are recorded with point-based sentence structures. That is, the structural point block 7 includes whole point statements 8 that represent the successive works to a process point. Each point statement 8 is information prepared for each point that needs a positioning in order to accomplish the main work at the process point. This point statement 8 includes, following to a point number 81, a point kind option 82, a point coordinate 83, and a point speed 84 disposed in sequence. In addition, the point statement 8 also includes, following to the point number 81, a work kind option 85, and a work number 86 disposed in sequence.

The point number 81 clarifies a declaration that the point statement is in a point-based sentence structure and a separator, and divides each point statement 8. The point kind option 82 indicates a combination of the kind of point and the moving method. The point kind is, for example, the routing point, the start point of the main work, or the end point of the main work. The moving method is, for example, a PTP movement, a linear interpolation movement, or a circular-arc interpolation with a designated supplemental point. With respect to the record of the point kind option 82 indicating the routing point, recording of plural point coordinates 83 indicating the routing point is permitted.

The work number 86 is an identifier that indicates an instruction set which describes the work details of the work tool 4. The instruction set is described in a robot language, such as SLIM (Standard Language for Industrial Manipulators) or super SEL language, and is stored beforehand in the storage 32. The work kind option 85 indicates a time period at which the work indicated by the work number 86 is to be executed. This work kind option 85 indicates a work before movement, a work during the movement, a work at the start point, a work at the end point, or the main work.

For example, the point statement 8 is expressed as "#1, CP start point, X=AA, Y=BB, Z=CC, speed 40, work during movement, and work number 1". The controller 3 identifies the separator of the point statement 8 based on the portion that is #1, controls the moving unit 2 with reference to the portions following to #1, and moves the work tool 4 to the coordinates that are obtained by the point coordinates 83 which are "X=AA, Y=BB, and Z=CC" at a speed obtained from the point speed 84 that is "speed 40" through the moving method which is obtained from the point kind option 82 that is "CP start point" and which draws a smooth circular arc.

In addition, the controller 3 executes the instruction set identified by the work number 86 that is "work number 1" during the movement which is obtained from the work kind option 85 that is "work during movement", and causes the robot 1 to execute the work of the work number 1.

As explained above, in the control data 6, the point statement 8 is recorded for each point that is positioned to accomplish the main work for the process point, and does not directly indicate the process point. Conversely, the whole point statements 8 that represent the successive works are bundled by the structural point block 7, and the process point is clarified by the structural point block 7.

The controller 3 has two modes: an operation mode that controls the moving unit 2 and the work tool 4 in accordance with the control data 6; and a programming mode that edits the control data 6. The programming mode includes an actual-device debug mode for checking the operation of the robot 1 in accordance with the control data 6.

In the operation mode, the controller 3 sequentially executes the whole point statements 8 in the control data 6, and controls the moving unit 2 and the work tool 4. That is, the controller 3 sequentially refers to the structural point blocks 7 from the header. In the referring operation to the structural point block 7, the controller 3 refers to the respective point statements 8 in the structural point block 7 from the header in sequence. Next, the controller 3 executes a control indicated by the point statement 8, and upon completion of the execution of the control indicated by the whole point statements 8, the controller 3 returns to the main routine. Once returning to the main routine, the controller 3 keeps referring to the following structural point blocks 7.

(Debugger Structure)

Figure 5:
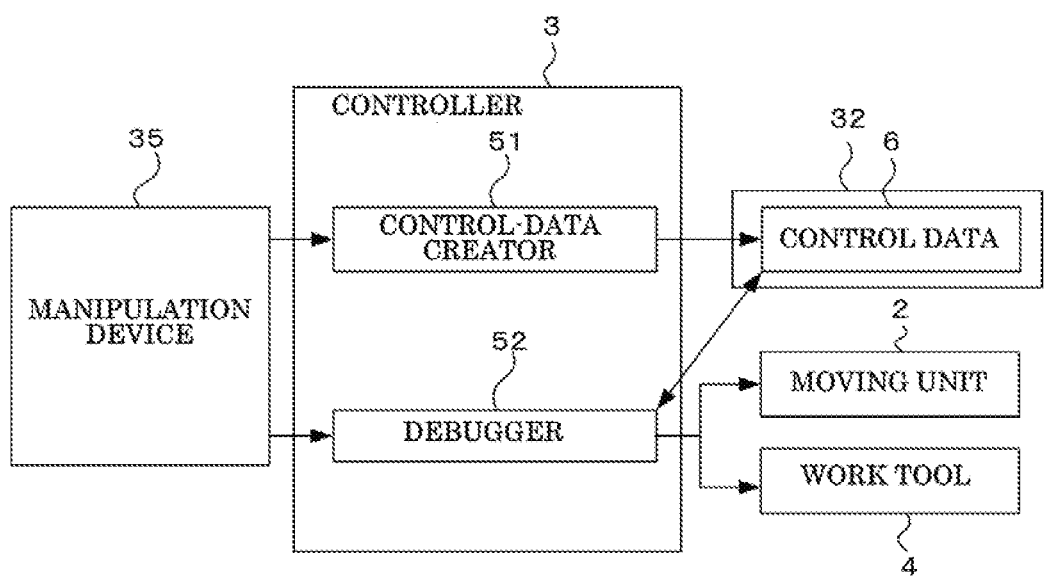
FIG. 5 is a block diagram illustrating a structure of the controller in a programming mode.

As illustrated in FIG. 5, in the programming mode, the controller 3 includes a control-data creator 51 and a debugger 52. The control-data creator 51 adds, deletes or collects each piece of data in the control data 6, and edits the control data 6 in accordance with an input to the console device 35 like the teaching pendant 351, the mouse and the keyboard.

The debugger 52 is a program intermittent executer which divides the control data 6, intermittently executes the divided pieces of control data 6, and intermittently operates the moving unit 2 and the work tool 4. The debugger 52 takes the respective structural point blocks 7 as the separator indications, and performs step-over execution for each structural point block 7.

Figure 6:
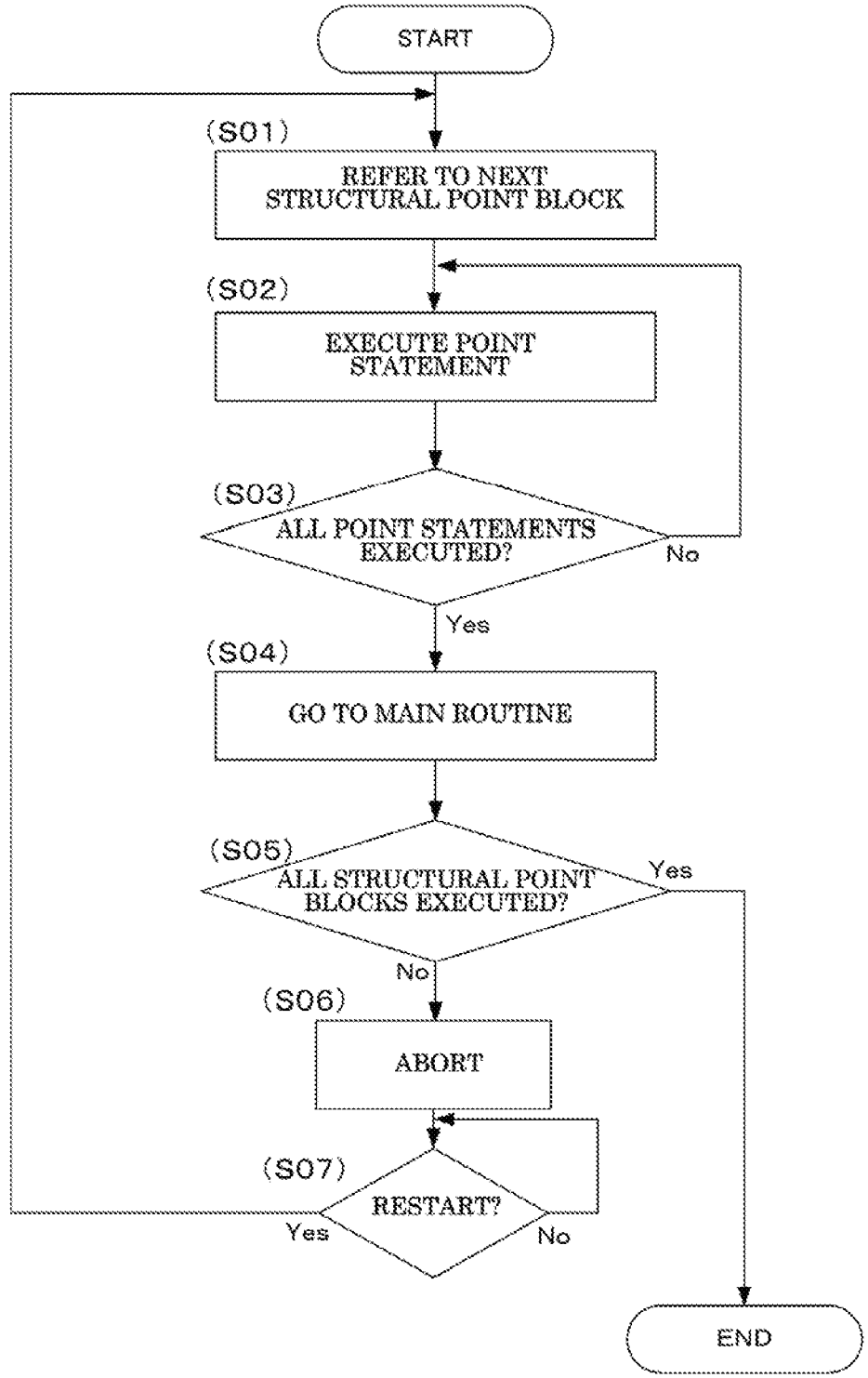
FIG. 6 is a flowchart illustrating a debugger control operation according to the first embodiment.

FIG. 6 is a flowchart illustrating a control operation for the debugger 52. As illustrated in FIG. 6, the debugger 52 refers to (step S01) the next structural point block 7 from the control data 6. When referring to the structural point block 7, the debugger 52 executes (step S02) the point statements 8 from the header in sequence within the referring structural point block 7. When there is a point statement 8 not executed yet (step S03: NO), the debugger 52 returns to the step S02, and executes (step S02) the next point statement 8.

When execution of the whole point statements 8 in the referring structural point block 7 completes (step S03: YES), the debugger 52 returns to (step S04) the main routine in the control data 6. Next, when there is still the next structural point block 7 (step S05: NO), the debugger 52 aborts (step S06) the execution of the control data 6.

When the user instructs (step S07: YES) the restart through the console device 35, the debugger 52 returns to the step S01, and refers to (step S01) the next structural point block 7 not executed yet. When the reference to all structural point blocks 7 completes (step S05: YES), the debugger 52 terminates the execution of the operation check with reference to the control data 6.

(Action and Effect)

The debugger 52 that intermittently executes the control data with the structural point blocks 7 being as separator indications as explained above causes the robot 1 to operate for successive works, once stop for the completion of successive works, wait for the restart instruction from the user given through the console device 35, and start the next successive works. That is, the control data 6 for the robot 1 has the whole point statements 8 which construct the successive works to a process point and which are bundled by a structural point block 7.

Hence, the debugger 52 that performs step-over execution on the blocks of the statement causes the robot 1 to operate in a unit of successive works to a process point, and thus the efficiency of the debug work for the user can be improved.

In addition, the control data 6 includes the structural point blocks 7 disposed in sequence for respective process points. In the case of the point-based sentence structure, a routing point, the start point, and the end point which do not directly indicate a process point are lined up. Hence, it is difficult for the user to understand which process point is associated with those points.

However, by constructing the control data 6 with an array of the structural point blocks 7 for the respective process points, the control data 6 can be read process point by process point. Therefore, the efficiency of the debug work for the user can be improved.

First Modified Example for Control Data

Figure 7:
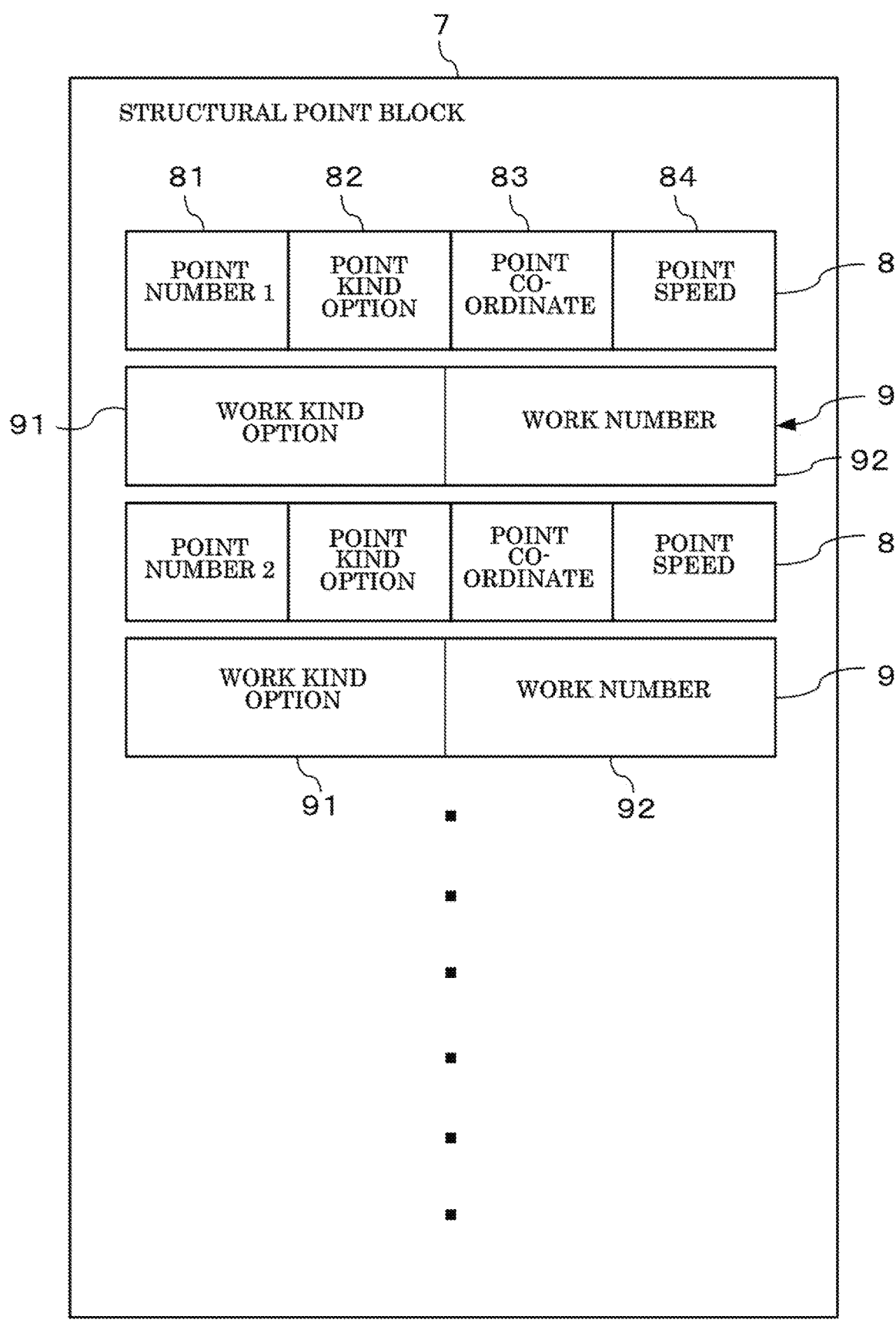
FIG. 7 is an exemplary diagram illustrating control data according to a first modified example.

FIG. 7 is an exemplary diagram illustrating a structural point block 7 arrayed in the control data 6. According to this control data 6, the work kind option 85 and the work number 86 are eliminated from the point statement 8, but form a work statement 9 that is a single sentence. This work statement 9 includes a work kind option 91 and a work number 92. The work statements 9 and the point statements 8 are arrayed in the execution order. The instruction set that constructs a work during movement is explicitly or implicitly repeated by the system during the movement.

As explained above, even if the contents of the structural point block 7 are not constructed by the point statements 8 only, and the work statements 9 are also present, as long as the successive works for a process point are bundled by the structural point block 7, the robot 1 can operate in a unit of the successive works to a process point in the debug work.

Second Modified Example of Control Data

Figure 8:
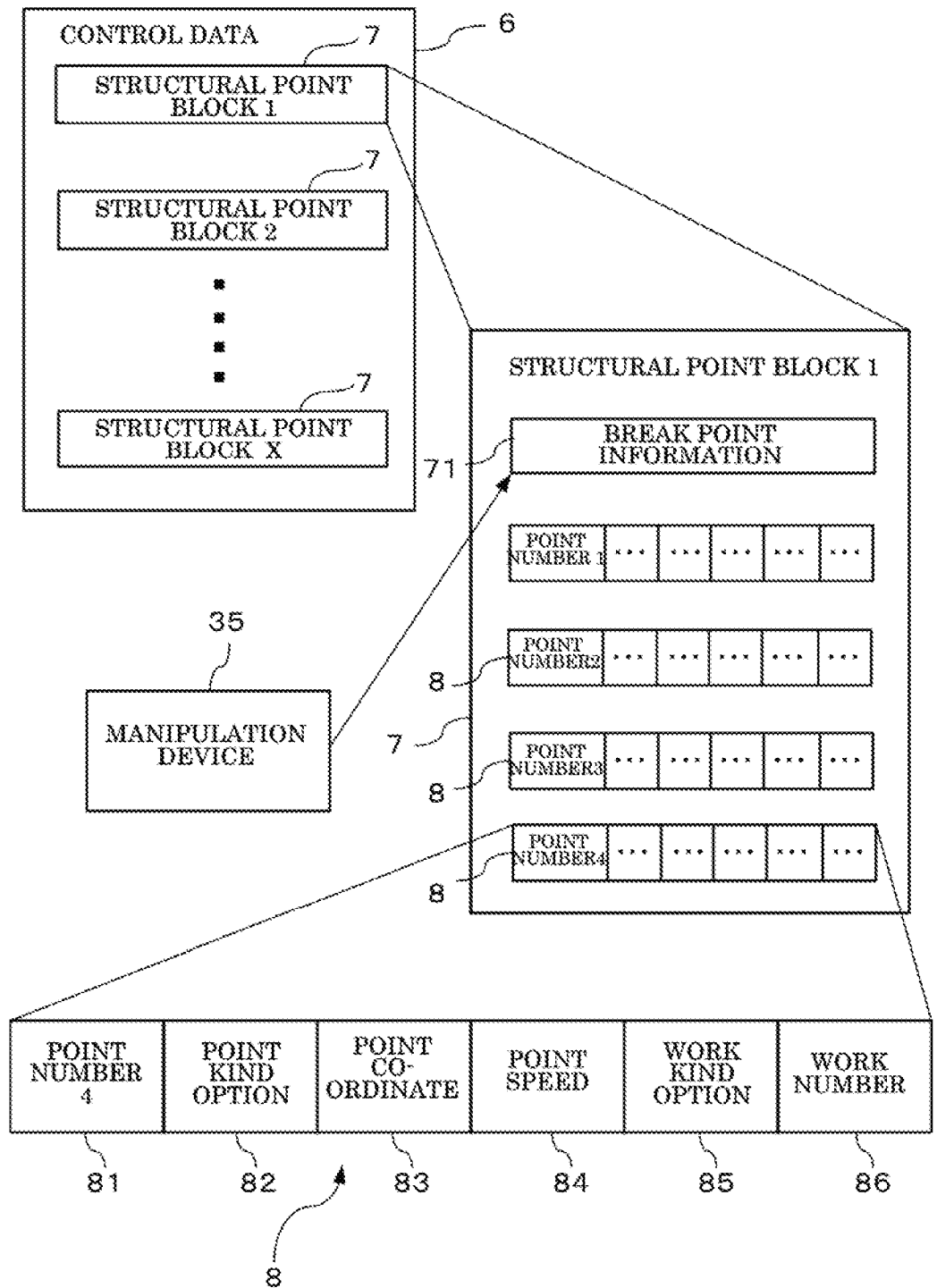
FIG. 8 is an exemplary diagram illustrating control data according to a second modified example.

FIG. 8 is an exemplary diagram illustrating control data 6 according to a second modified example. As illustrated in FIG. 8, break point information 71 can be added to the structural point block 7. The break point information 71 is written through the creation of the control data 6 and the edition thereof with the console device 35 in the programming mode, and becomes valid in the debug mode.

Figure 9:
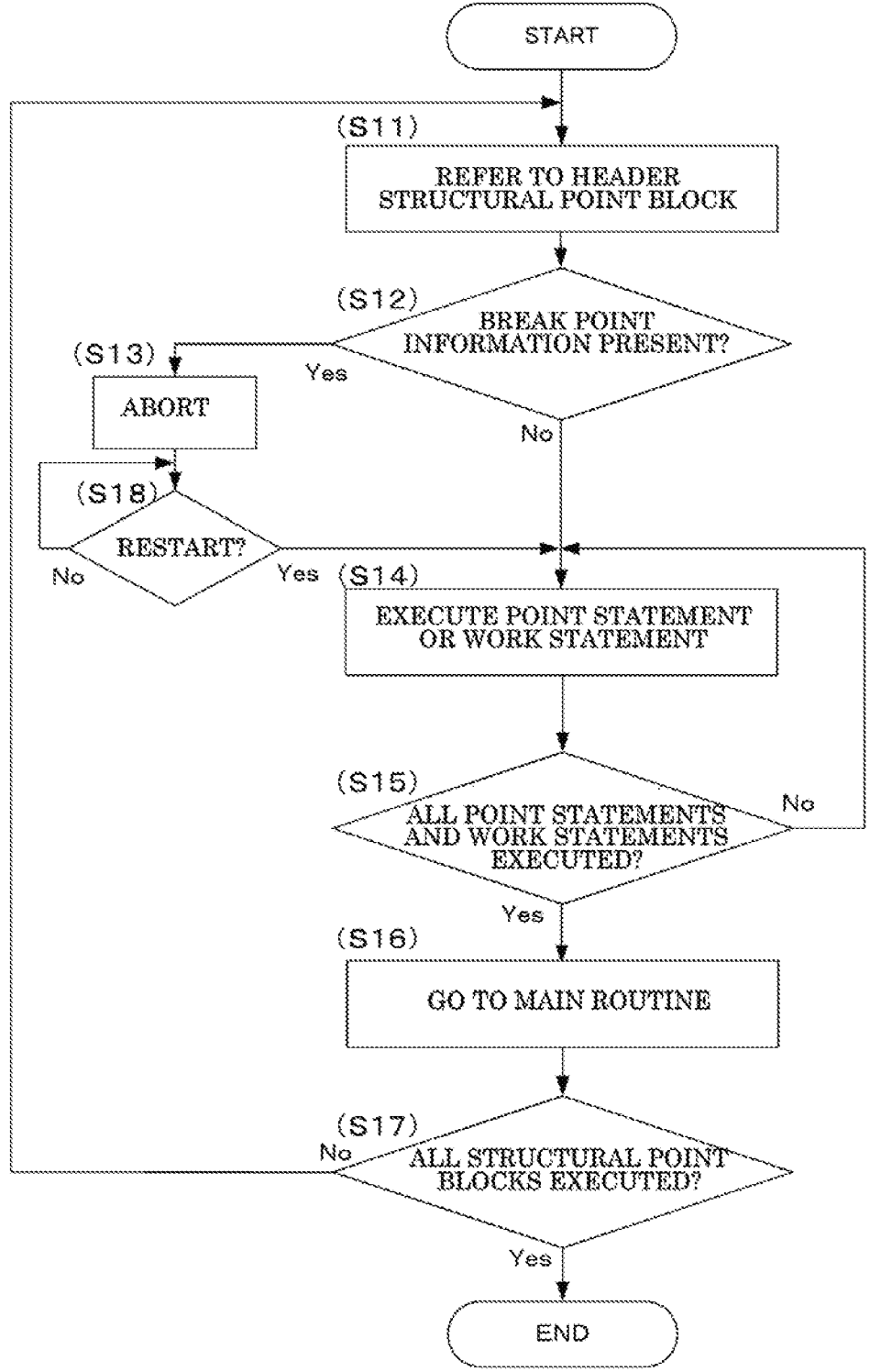
FIG. 9 is a flowchart illustrating a debugger control operation based on the control data of the second modified example.

The operation in the debug mode in accordance with the control data 6 is as follow. That is, as illustrated in FIG. 9, the debugger 52 refers to (step S11) the header structural point block 7 not executed yet in the control data 6. When the referring structural point block 7 contains the break point information 71 (step S12: YES), the execution of the control data 6 is aborted (step S13).

Conversely, when there is no break point information 71 (step S12: NO), the debugger 52 executes (step S14) the header point statement 8 or work statement 9 not executed yet in the referring structural point block 7. When there is still a point statement 8 or a work statement 9 not executed yet (step S15: NO), the debugger 52 returns to the step S14, and executes the next header point statement 8 or work statement 9 not executed yet.

When the execution of all point statements 8 or work statements 9 contained in the referring structural point block 7 completes (step S15: YES), the debugger 52 returns to (step S16) the main routine. When there is still a structural point block 7 not executed yet (step S17: NO), the debugger 52 returns to the step S11, refers to (step S11) this structural point block 7, and aborts (step S13) the execution when there is the break point information 71 (step S12: YES).

During the aborting operation in the step S13, when the user instructs the restart through the console device 35 (step S18: YES), the debugger 52 returns to the step S14, and executes the referring structural point block 7. When execution of all structural point blocks 7 completes (step S17: YES), the debugger 52 terminates the execution of the control data 6.

The aborting method in accordance with the break point information 71 and the aborting method in accordance with the structural point block 7 are selectable through the console device 35 in the debug mode of the actual device.

As explained above, in the debug work, when the execution in the unit of the structural point block 7 and the successive operations up to the set break point are selectable, an appropriate execution method can be adopted in accordance with the advancing stage of the debug work. Hence, the debug work can be made further efficient.

Third Modified Example of Control Data

Figure 10:
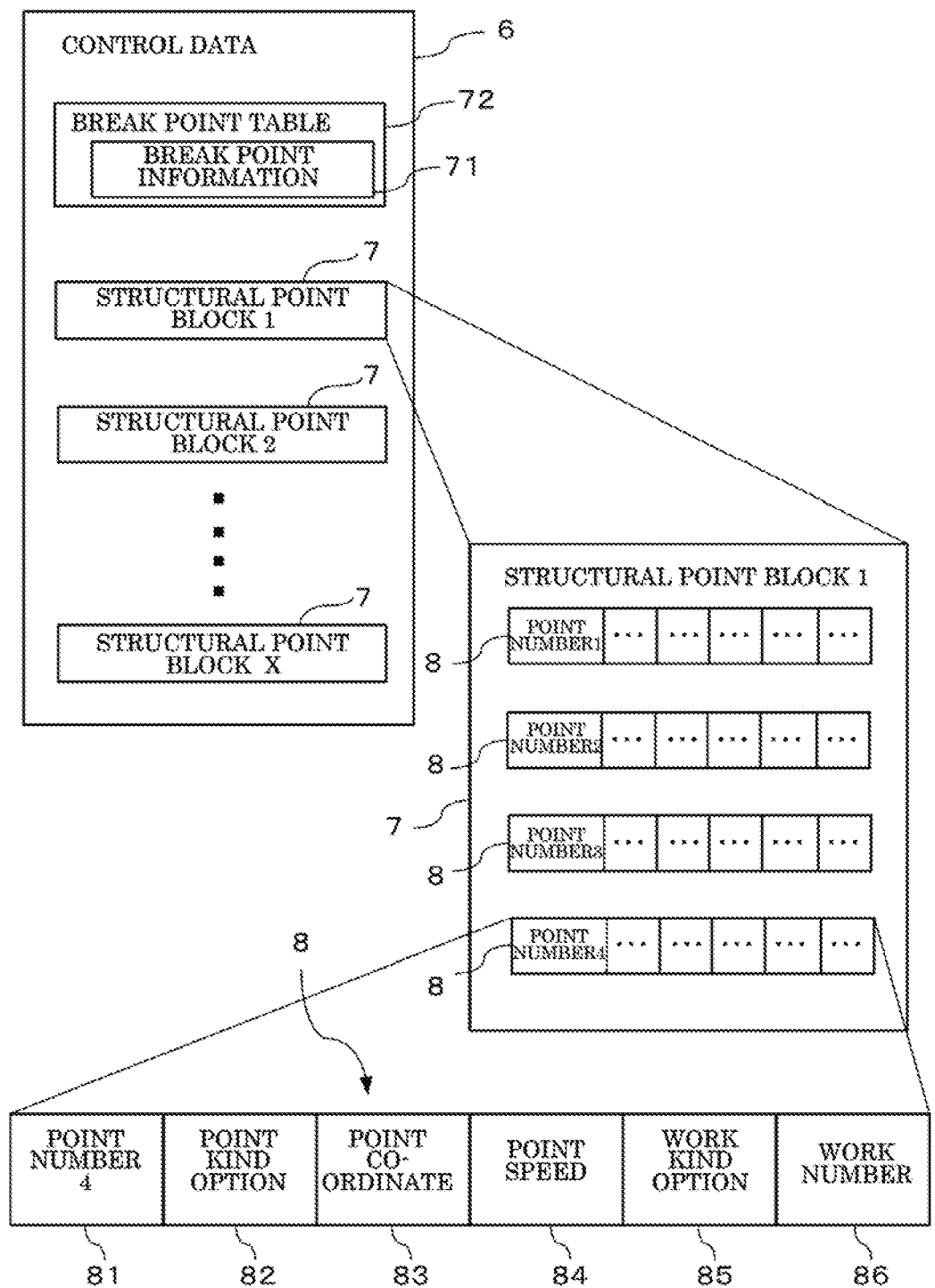
FIG. 10 is an exemplary diagram illustrating control data according to a third modified example.

As illustrated in FIG. 10, the control data 6 contains a break point table 72. This break point table 72 stores the break point information 71 that indicates the structural point block 7 to be aborted before the execution. This break point information 71 is expressed as, for example, the name of the structural point block 7.

The debugger 52 refers to the break point table 72 before referring to the structural point block 7, and determines whether or not the referring structural point block 7 matches the break point information 71 stored in the break point table 72. When the referring structural point block 7 matches, the debugger 52 aborts before executing the referring structural point block 7, waits for the restart instruction given through the console device 35, and restarts the execution of the structural point block 7.

As explained above, when the break point information 71 is recorded in a separate table from the control data 6, placement, replacement, and deletion of the break point information 71 become easy, and thus the efficiency of the debug work can be further improved. That is, it becomes unnecessary for the user to read the contents of the control data 6 to, for example, place the break point information 71.

Second Embodiment

Next, an explanation will be given of a robot according to a second embodiment with reference to the figures. The same structure and function as those of the first embodiment will be denoted by the same reference numeral, and the duplicated explanation will be omitted.

(Control Data Structure)

FIG. 11 is an exemplary diagram illustrating control data 6 according to the second embodiment. This control data 6 arrays therein the point statements 8 constructing successive works for each process point. This control data 6 does not divides the array of point statements 8 for successive works unlike the case in which the point statements 8 are bundled by the structural point block 7.

For example, point statements 8 for first successive works that have a start point with coordinates (X, Y, Z)=(100, 120, 50), and point statements 8 for second successive works that have a start point with coordinates (X, Y, Z)=(100, 240, 50) are arranged in sequence with respective point numbers 81.

The first successive works correspond to the point numbers 1 to 6, and according to this control data 6, the work tool 4 passes through two avoidance points, moves linearly to the start point, passes through two routing points from the start point, moves to the end point so as to draw a circular arc, and executes the main work indicated by the "work number 4" up to the movement to the end point.

The second successive works correspond to the point numbers 7 to 13, and according to this control data 6, the work tool 4 passes through two avoidance points, moves linearly to the start point from the end point of the first successive works, passes through three routing points from the start point, moves to the end point so as to draw an arcuate trajectory, and executes the main work indicated by the "work number 4" up to the movement to the end point.

(Debugger)

Figure 12:
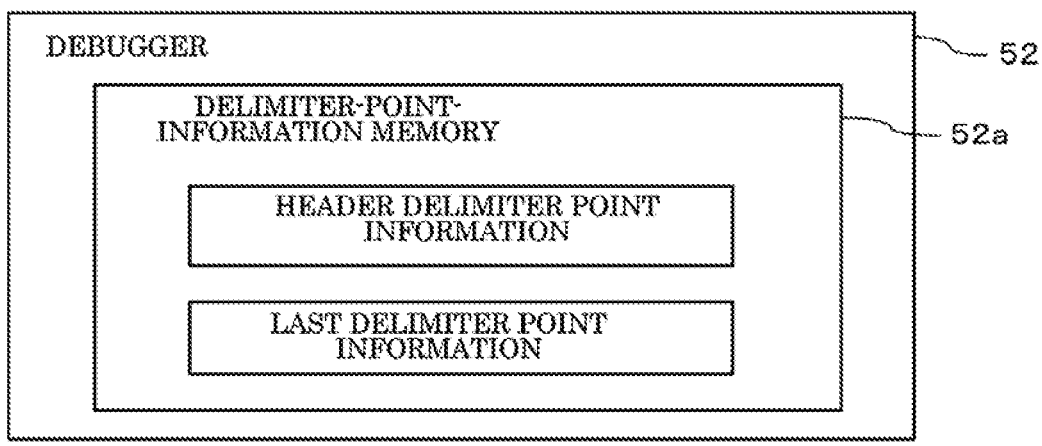
FIG. 12 is a block diagram illustrating a structure of a debugger of the second embodiment.

As illustrated in FIG. 12, the debugger 52 includes a separator-point-information memory 52a mainly constructed by the storage 32, and the separator-point-information memory 52a stores beforehand header separator point information and last separator point information. The header separator point information and the last separator point information indicate the kind of the header point statement 8 in the successive works and that of the last point statement 8 therein, respectively. For example, the header point statement 8 relates to a series of routing points, while the last point statement 8 relates to the end point.

Figure 13:
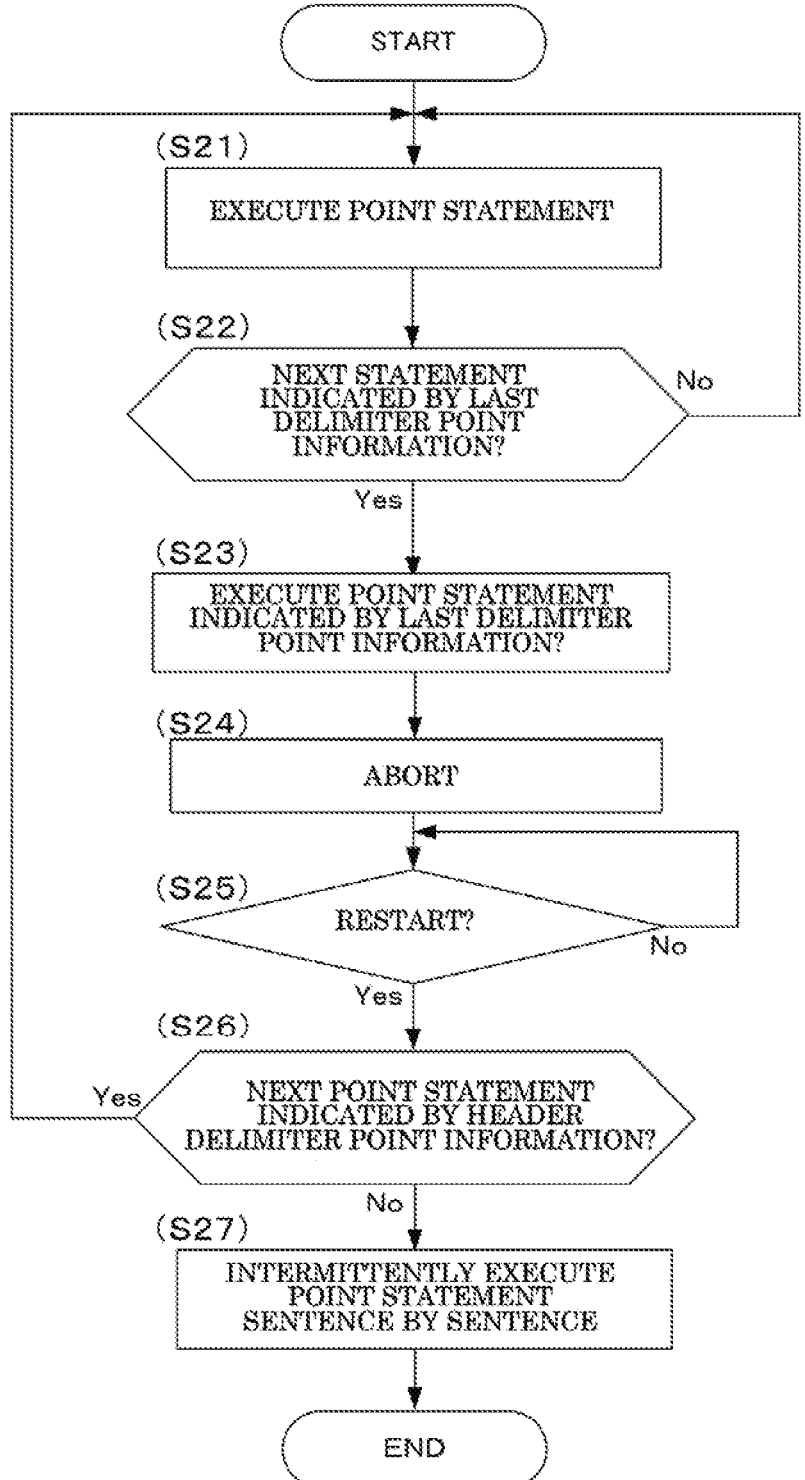
FIG. 13 is a flowchart illustrating a debugger control operation of the second embodiment.

As illustrated in FIG. 13, when completing the execution of the next point statement 8 (step S21), the debugger 52 refers to the last separator point information stored in the separator-point-information memory 52a, and also determines (step S22) whether or not the next point statement 8 is the last point statement 8.

When determining that this is the point statement 8 indicated by the last separator point information (step S22: YES), the debugger 52 executes (step S23) this point statement 8, and then aborts (step S24) the execution. Conversely, when determining that this is not the point statement 8 indicated by the last separator point information (step S22: No), the debugger 52 returns to the step S21, and continues the sequential execution of the point statements 8.

After the aborting (step S24), the debugger 52 waits for (step S25) the restart instruction given through the console device 35, refers to the header separator point information stored in the separator-point-information memory 52a, and also determines (step S26) whether or not the next point statement 8 is the first point statement 8.

When determining that this is the point statement 8 indicated by the header separator point information (step S26: YES), the debugger 52 returns to the step S21, and continues the sequential execution of the point statements 8. Conversely, when determining that this is not the point statement 8 indicated by the header separator point information (step S26: NO), the debugger 52 transitions the operation (step S27) to the intermittent execution of the point statements 8 sentence by sentence.

As explained above, the structural point block 7 can be implicitly constructed without bundling the point statements 8 to facilitate the user to read, and can be sequentially executed in a unit of successive works in the debug work. Therefore, the programming latitude can be improved.

Third Embodiment

Next, an explanation will be given of a robot according to a third embodiment with reference to the figures. The same structure and function as those of the first embodiment will be denoted by the same reference numeral, and the duplicated explanation will be omitted.

(Debugger)

Figure 14:
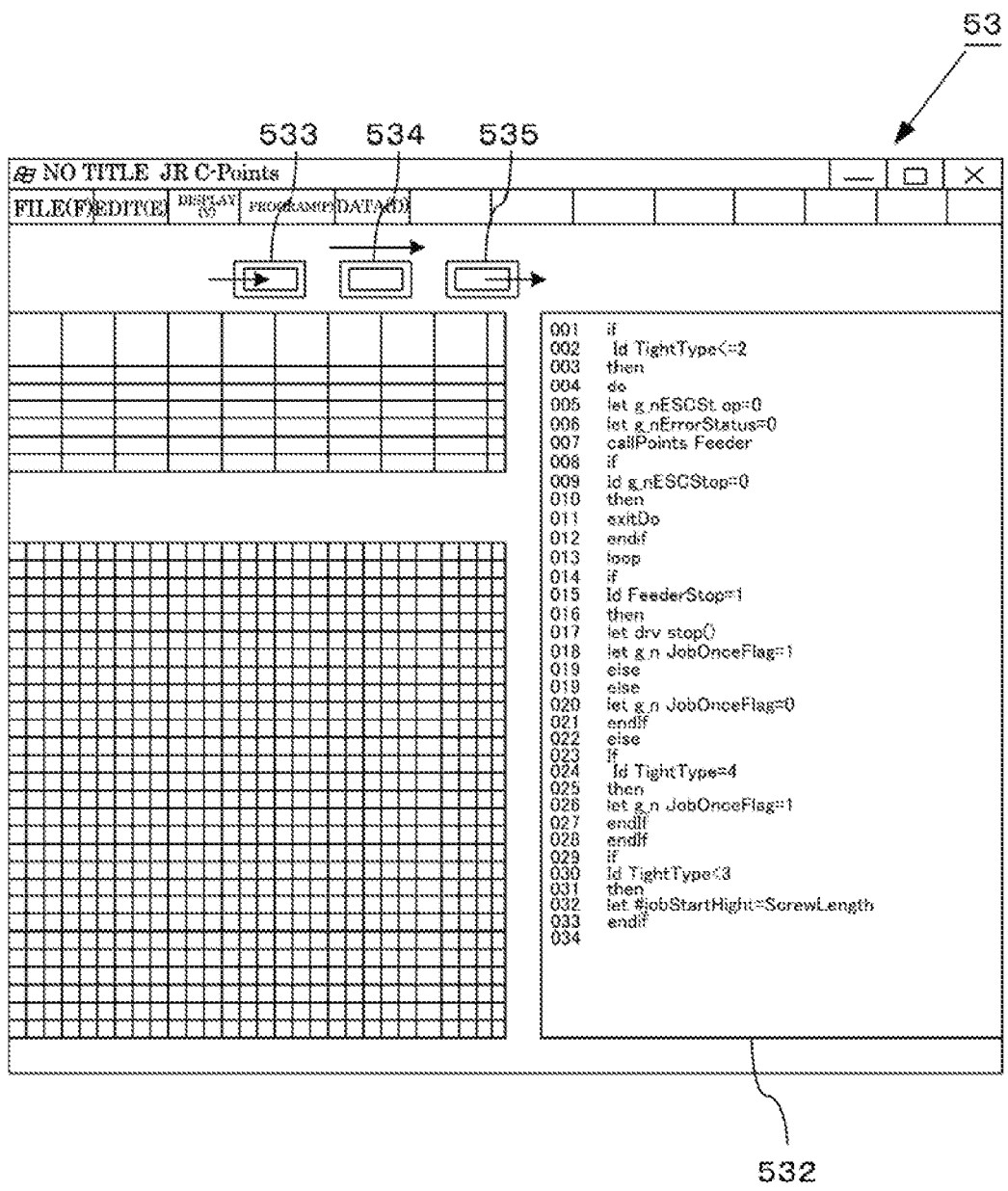
FIG. 14 is an exemplary diagram illustrating a operation screen displayed on a display by a debugger according to a third embodiment.

The debugger 52 performs step-in execution, step-over execution, or step-out execution on the control data 6 in response to an operation given through the console device 35. FIG. 14 is an exemplary diagram illustrating an operation screen to check the operation of the robot according to the third embodiment. Displayed in this operation screen are a step-in execute button 533, a step-over execute button 534, and a step-out execute button 535.

Figure 15:
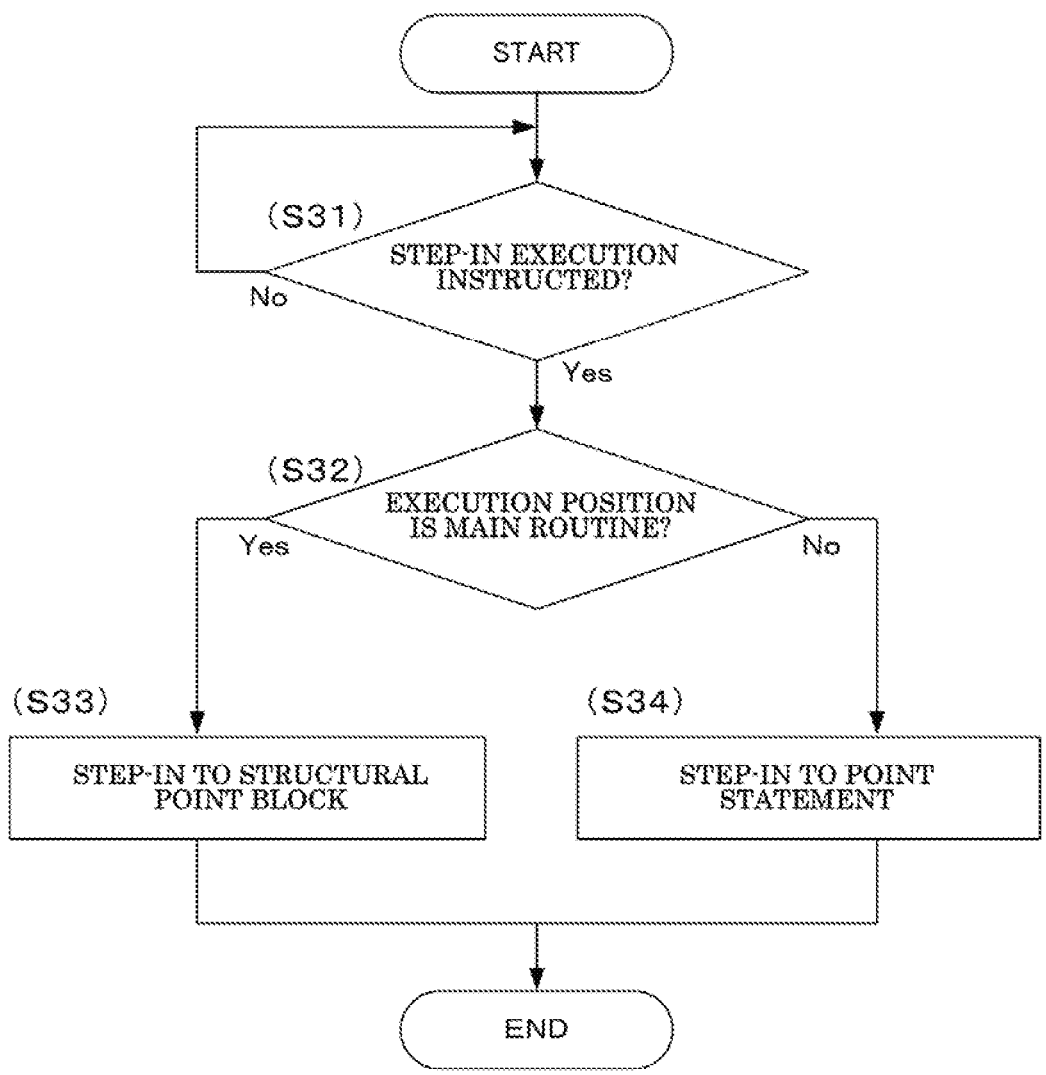
FIG. 15 is a flowchart illustrating a debugger control operation when a step-in execute button is depressed according to the third embodiment.

As illustrated in FIG. 15, when the step-in execute button 533 is depressed (step S31: YES) and the execution position is in the main routine (step S32: YES), the debugger 52 performs step-in (step S33) to the structural point block 7. That is, the debugger 52 aborts the execution of the control data 6 at the header of the structural point block 7.

Conversely, when the step-in execute button 533 is depressed and the execution position is within the structural point block 7 (step S32: NO), the debugger 52 performs step-in (step S34) from the structural point block 7 to the point statement 8. That is, the debugger 52 executes the point statement 8 at the execution position, and aborts at the completion of the execution of this point statement 8. When the point statement 8 is constructed by the instruction set, the debugger 52 executes the point statement 8 step by step, and aborts the execution.

Figure 16:
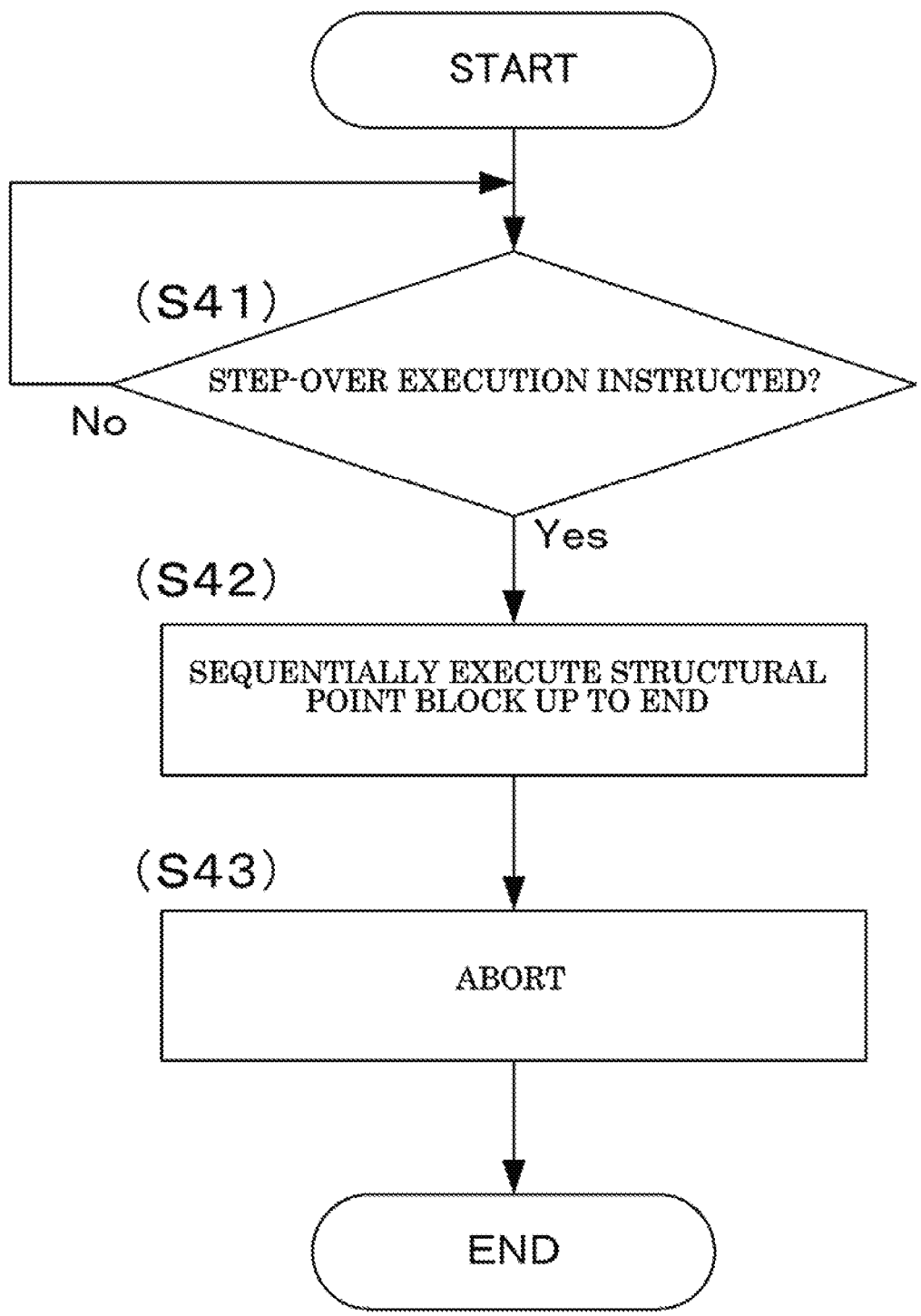
FIG. 16 is a flowchart illustrating a debugger control operation when a step-over execute button is depressed according to the third embodiment.

In addition, as illustrated in FIG. 16, when the step-over execute button 534 is depressed (step S41: YES), the debugger 7 sequentially executes (step S42) the structural point block 7 up to the end, and aborts (step S43) the execution at the next structural point block 7. That is, the same control operation as that of the debugger 52 of the first embodiment is performed.

Figure 17:
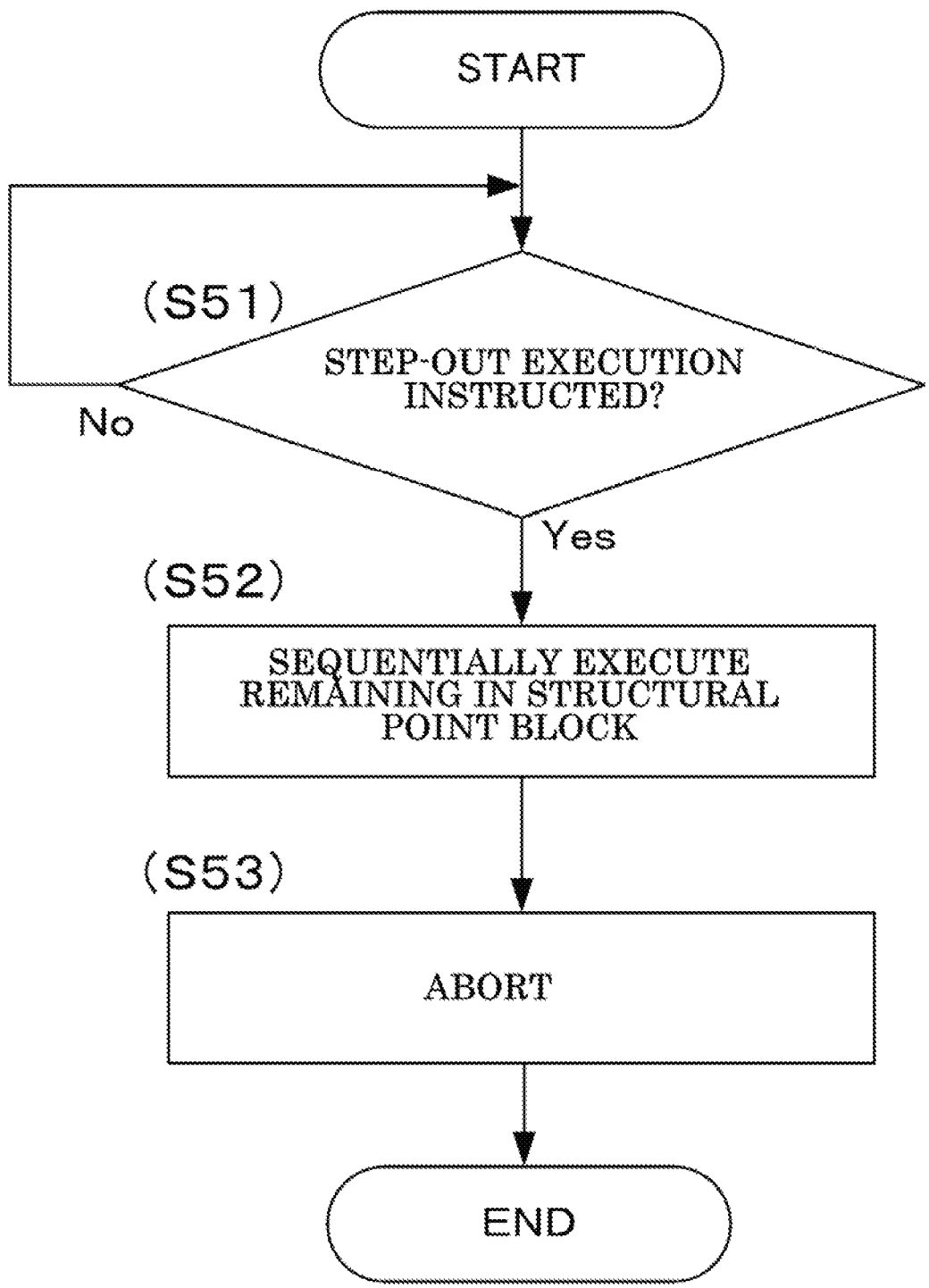
FIG. 17 is a flowchart illustrating a debugger control operation when a step-out execute button is depressed according to the third embodiment.

Still further, as illustrated in FIG. 17, when the step-out execute button 535 is depressed (step S51: YES), the debugger 52 sequentially executes (step S52) the remaining contents in the structural point block 7, returns to the main routine upon the completion of the sequentially executed structural point block 7, and then aborts (step S53) the execution.

As explained above, upon depression of the step-in execute button 533, the debugger 52 intermittently executes the control data 6 step by step. In addition, upon depression of the step-over execute button 534, the debugger 52 sequentially execute the control data 6 for each structural point block 7. Still further, upon depression of the step-out execute button 535, the debugger 52 transitions the operation from the step-in execution to the step-over execution on the structural point block 7.

This enables the user to execute an appropriate debug operation in accordance with the advancing stage of the debug work, and thus the efficiency of the debug work can be further improved.

Fourth Modified Example of Control Data

Figure 18:
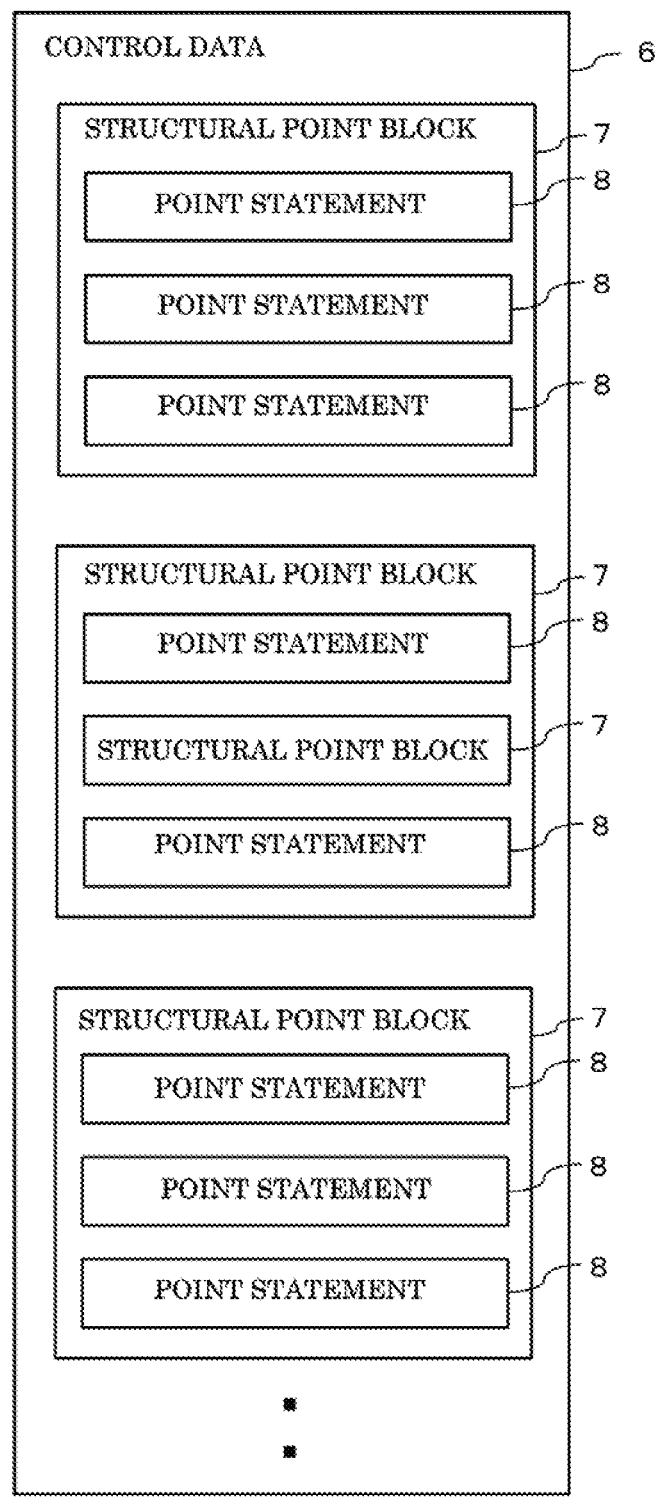
FIG. 18 is a diagram illustrating control data according to a fourth modified example.

FIG. 18 is an exemplary diagram illustrating control data 6 according to a fourth modified example. This control data 6 explicitly arrays the structural point blocks 7 in the main routine, and a further nested structural point block 7 is disposed in the structural point block 7. This nested structural point block 7 is recorded in the upper-layer structural point block 7 with a call instruction of the structural point block 7 like "Call Points".

In the case of the control data 6 employing this structure, upon depression of the step-in execute button 533, the debugger 52 executes the point statements 8 one by one in the nested structural point block 7, and aborts for each execution. Upon depression of the step-over execution 534, the debugger 52 sequentially executes all point statements 8 in the nested structural point block 7, returns in the upper-layer structural point block 7, and then aborts the execution. In addition, when the step-out execute button 535 is depressed during the step-in execution, the debugger 52 executes all remaining contents in the nested structural point block 7, returns in the upper-layer structural point block 7, and then aborts the execution.

Fourth Embodiment

Next, an explanation will be given of a robot according to a fourth embodiment with reference to the figures. The same structure and function as those of the first embodiment or the modified example thereof will be denoted by the same reference numeral, and the duplicated explanation will be omitted.

(Debugger)

Figure 19:
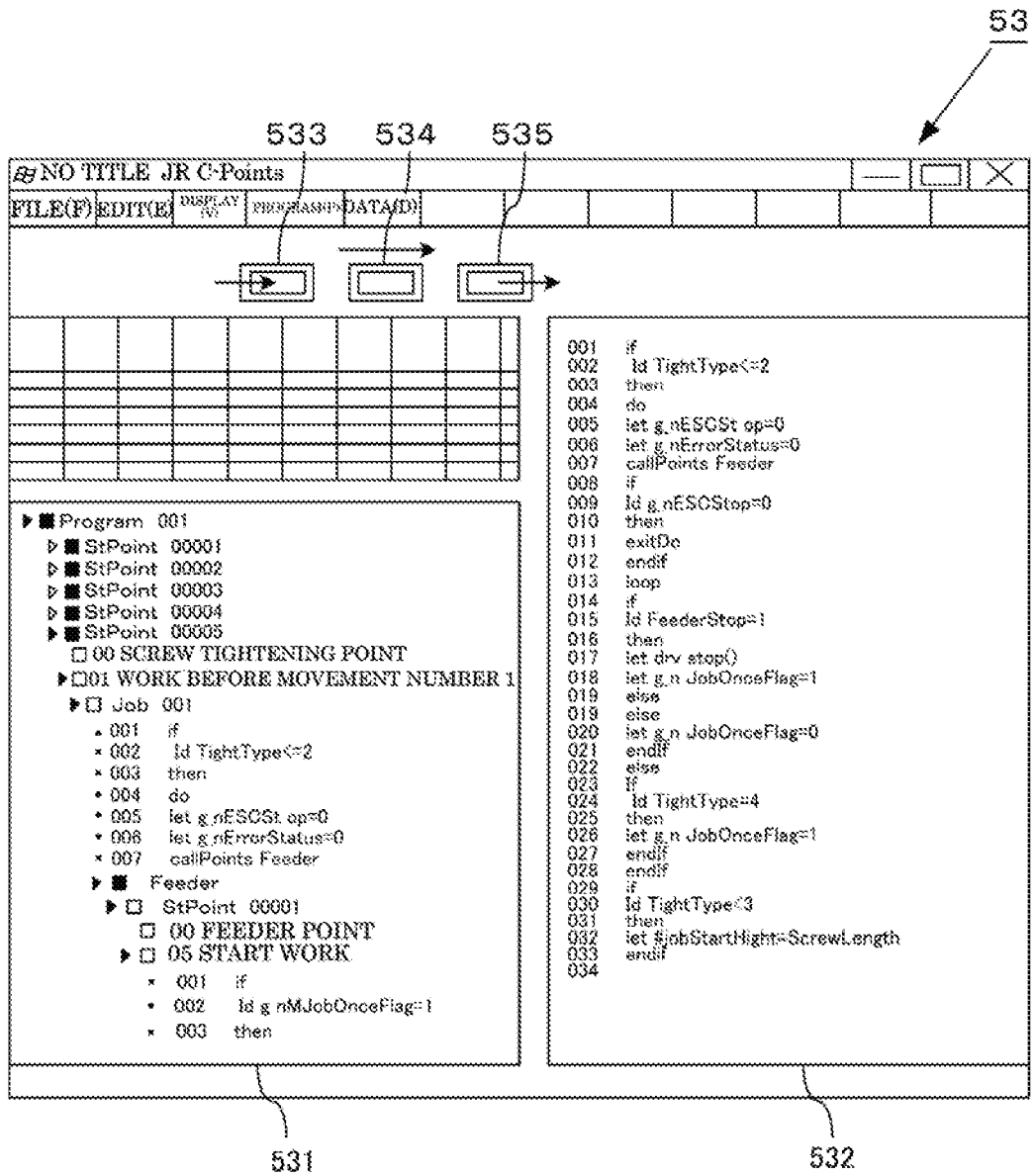
FIG. 19 is an exemplary diagram illustrating a operation screen displayed on a display by a debugger according to a fourth embodiment.

FIG. 19 illustrates an operation screen 53 displayed on the display 352 in the programming mode. As illustrated in FIG. 19, the controller 3 displays the operation screen 53 on the display 352. The operation screen 53 can be divided into a structure creating column 531 and a code describing column 532. The structure creating column 531 displays the tree views of the structure of the control data 6.

In the structure creating column 531, the main routine is expanded in the upper hierarchy. The structural point blocks 7 are disposed in the main routine in sequence. The array of the structural point blocks 7 enables the user to recognize the separator of the program for each point. When the structural point block 7 is expanded, the point statements 8 are disposed in sequence. The array of the point statements 8 enables the user to recognize the work details for each process point with reference to a point to which the work tool 4 is to be moved.

In accordance with an operation through the console device 35 in the structure creating column 531, the control-data creator 51 adds the structural point block 7 to the control data 6. In addition, in accordance with an operation through the console device 35 in the structure creating column 531, the control-data creator 51 adds the point statement 8 to the structural point block 7. Still further, in accordance with a key input through the console device 35 or teaching in the code describing column 532, the point statement 8 is edited, and a code of an instruction set indicated by the work number 86 is described.

The debugger 52 displays the execution position of the control data 6 in the structure creating column 531. The structural point block 7 being executed is expanded, and the icon for the point statement 8 being executed is emphasized. When the work statement 9 is being executed, the instruction set with the work number 92 in the work statement 9 is expanded, and the instruction being executed is emphasized. In addition, in accordance with an operation through the console device 35 in the structure creating column 531, the debugger 52 adds the break point information 71 to the designated structural point block 7.

Hence, the user can visually grasp the array of the structural point blocks 7 in the control data 6. That is, the user can read the control program in a unit of successive works for each process point. Therefore, the efficiency of the debug work can be further improved.

Fifth Embodiment

Next, an explanation will be given of a robot according to a fifth embodiment with reference to the figures. The same structure and function as those of the first modified example of the first embodiment will be denoted by the same reference numeral, and the duplicated explanation will be omitted.

(Control Data)

Figure 20:
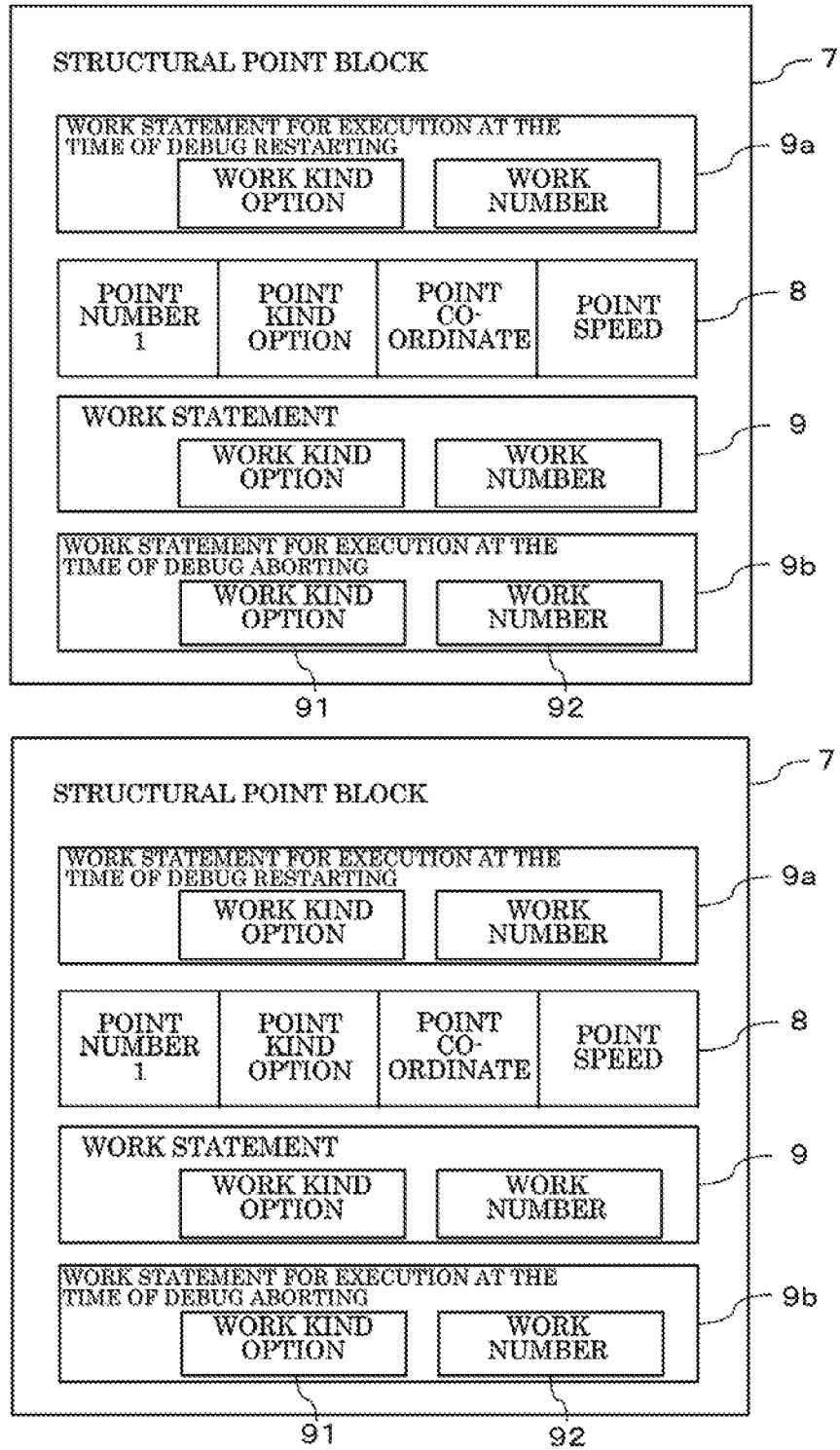
FIG. 20 is an exemplary diagram illustrating a structural point block in control data according to a fifth embodiment.

FIG. 20 is an exemplary diagram illustrating the structural point blocks 7 arrayed in the control data 6. Each structural point block 7 arrays therein a point statement 8 and a work statement 9. This structural point block 7 arrays therein a work statement 9a for execution at the time of debug restarting, and a work statement 9b for execution at the time of debug aborting.

The process details of the work statement 9a for the execution at the time of debug restarting are work details to be executed beforehand at the initial stage of the control data 6 when a sequential execution is performed through each structural point block 7 in the operation mode. The work details are, for example, laser emission to perform laser cutting with plural process points being linked one another. The process details of the work statement 9b for the execution at the time of debug aborting are the work details to be executed at the last stage of the control data 6 when a sequential execution is performed through each structural point block 7 in the operation mode. For example, the work details are termination of laser emission to perform laser cutting with the plural process points being linked one another.

(Debugger)

The work statements 9a, 9b for execution at the time of debug restarting and debug aborting are ignored in the operation mode, but when a specific condition is satisfied in the debug mode on the actual device, the debugger 52 executes those work statements. The specific condition is the initial stage of the step-over execution for the work statement 9a for the execution at the time of debug restarting, and is the last stage of the step-over execution or the step-out execution for the work statement 9b for the execution at the time of debug aborting.

Figure 21:
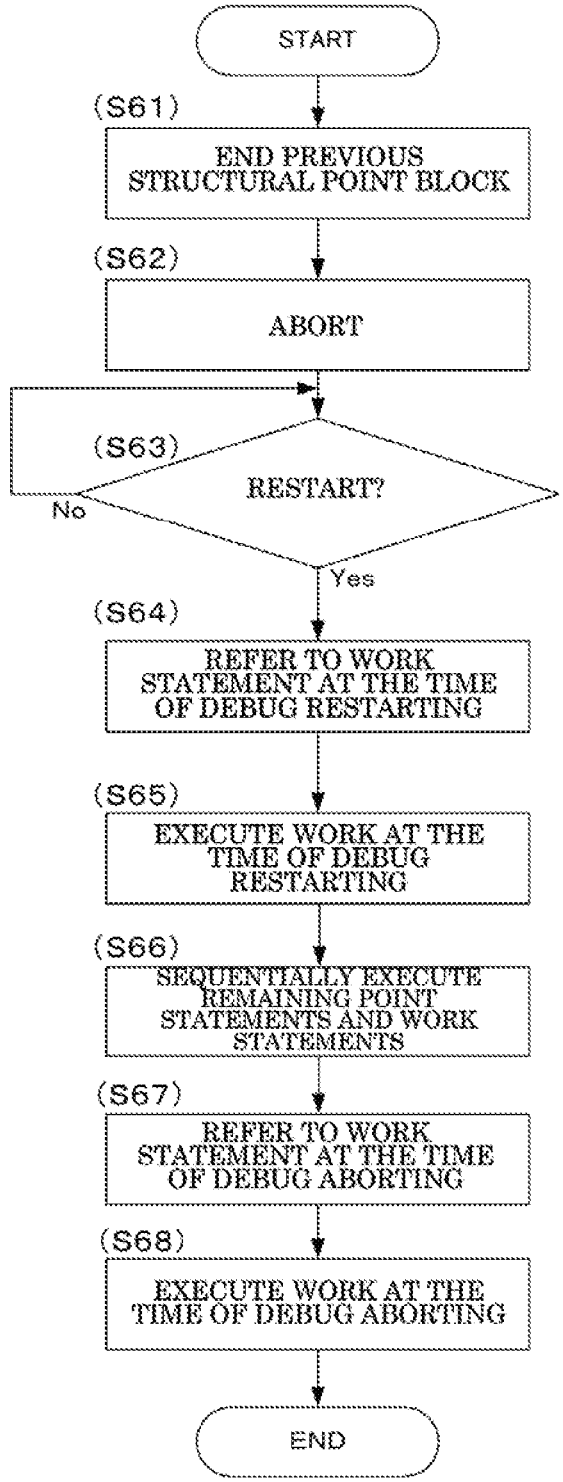
FIG. 21 is a flowchart illustrating a debugger control operation of the fifth embodiment.

FIG. 21 is a flowchart illustrating a control operation for the debugger 52. As illustrated in FIG. 21, when the execution of the current structural point block 7 completes (step S61), the debugger 52 aborts (step S62) the execution. Next, when the user gives a restart instruction through the console device 35 (step S63: YES), the debugger 52 refers to (step S64) the work statement 9a for the execution at the time of debug restarting in the next structural point block 7, and executes (step S65) the work at the time of debug restarting. When the work at the time of debug restarting relates to the operation of the robot 1, the debugger 52 controls the moving unit 2 and the work tool 4.

When the execution of the work statement 9a for the execution at the time of debug restarting completes (step S65), the debugger 52 sequentially executes (step S66) the remaining point statement 8 and work statement 9 in the referring structural point block 7.

When the sequential execution of the remaining point statement 8, etc., completes (step S66), the debugger 52 refers to (step S67) the work statement 9b for the execution at the time of debug aborting in the structural point block 7, and executes (step S68) the work at the time of debug aborting. When the work at the time of debug aborting relates to the operation of the robot 1, the debugger 52 controls the moving unit 2 and the work tool 4.

When the sequential execution of all statements in the referring structural point block 7 including the work statements 9a, 9b for execution at the time of debug restarting and debug aborting completes (step S61), the process progresses to the step S62, and the debugger 52 aborts (step S62) the execution.

When the execution of the program is aborted in the debug work, the user may want to also stop the process that causes the system to keep operating during the execution of the control data 6. For example, the user may want to stop laser emission in order to review the condition of the actual device in the case of laser processing.

According to this robot 1, the work statement 9b for the execution at the time of debug aborting can automatically stop the work that the user wants to stop together with the suspension of the robot 1.

Conversely, when the work that the user wants to stop is stopped together with the suspension of the robot 1, a defect may occur when the next structural point block 7 is executed since the stopped work is not restarted. For example, in the case of laser processing, the user cannot check the operation in the next process point without laser emission.

Hence, the robot 1 can execute the work once stopped at the time of the start of the execution of the next structural point block 7 based on the work statement 9a for the execution at the time of debug restarting.

Hence, an error and cumbersome efforts at the time of debug work can be eliminated, and the efficiency of the debug work can be improved.

Other Embodiments

Embodiments of the present invention were explained above, but various omissions, replacements, and modifications can be made thereto without departing from the scope of the present invention. Such embodiments and modified examples thereof are within the scope and spirit of the present invention, and are also within the scope of the claimed invention and the equivalent range thereto.

For example, the explanation was given of an example case in which the programming for the robot 1 was directly performed on the robot 1, but the present invention is not limited to this example case, and programming may be performed through a programming tool like a computer separate from the robot 1, and the control data 6 may be loaded in the robot 1.

What is claimed is:

1. A robot repeating successive works for each process point, the robot comprising:
    a work tool performing a main work on each process point in the successive works;
    a moving unit moving the work tool in the successive works;
    a controller controlling the work tool and the moving unit;
    a storage storing control data having entire point statements that form successive works for a process point, the control data having a plurality of structural point blocks, each structural point block bundling the successive works for each process point; and
    a debugger, the debugger subdividing the control data into the structural point blocks, executing the entire point statements of each structural point block without aborting therein, and aborting the execution of the controlling data each time when the execution of the entire point statements of each structural point block completes, thereby intermittently executing the plurality of structural point blocks so as to intermittently operate the moving unit and the work tool process-point by process-point,
    wherein, in responding to the debugger, the controller automatically stops the successive work together with suspension of operation of the robot.

2. The robot according to claim 1, wherein:
    the successive works includes the main work by the work tool, a pre-process work and a post-process work before and after the main work, and positioning to a plurality of points for the main work; and
    the structural point block records data representing a work in the successive works and details of movement.

3. The robot according to claim 2, wherein:
    the structural point block arrays therein point statements, the point statements each being data indicating all points for positioning during a set of the successive works and details of a work before, after, or during movement to the point; and
    the debugger sequentially executes all point statements contained in the structural point block, and aborts the sequential execution of the control data.

4. The robot according to claim 2, wherein:
    the structural point block arrays therein:
    a point statement that is data indicating all points for positioning during a set of the successive works; and
    a work statement that is data indicating all works to be executed before, after, or during movement in the set of the successive works, and the debugger sequentially executes all point statement and work statement contained in the structural point block, and aborts the sequential execution of the control data.

5. The robot according to claim 1, further comprising a console device that accepts a user's operation,
    wherein the debugger comprises:
    a step-over executer sequentially executing the control data in a unit of the structural point block and aborting in accordance with a selection of step-over execution through the console device; and
    a step-in executer aligning an execution position with a header of contents of the structural point block and aborting in accordance with a selection of step-in execution through the console device, and intermittently executing statement by statement in response to a restart instruction given through the console device, and aborting the execution.

6. The robot according to claim 5, wherein the debugger further comprises a step-out executer sequentially executing all remaining statements in the structural point block in accordance with a selection of step-out execution through the console device after the selection of the step-in execution, stepping out from the structural point block, and aborting the execution.

7. The robot according to claim 1, wherein:
    the control data records the nested structural point block; and
    the debugger comprises:
    a nesting step-over executer sequentially executing all contents of the nested structural point block; and
    a nesting step-in executer intermittently executing the contents of the nested structural point block statement by statement.

8. The robot according to claim 7, wherein the debugger further comprises a nesting step-out executer sequentially executing all remaining statements in the nested structural point block, stepping out from the nested structural point block, and aborting the execution.

9. The robot according to claim 1, further comprising a display displaying a tree view of a structure of the control data.

10. The robot according to claim 1, wherein:
    the debugger executes an initial process before referring to the point statements in the structural point blocks, and executes a last process after referring to the point statements in the structural point blocks; all of the structural point blocks record:
    an initial statement which is a single or plural sentences that are an instruction set or a call instruction thereof indicating details of the initial process; and
    a last statement which is a single or plural sentences that are an instruction set or a call instruction thereof indicating details of the last process;
    the controller ignores the initial statement and the last statement in the structural point blocks; and
    the debugger executes the initial statement and the last statement in the structural point blocks,
    wherein, in responding to the debugger, the controller automatically stops the successive work together with suspension of operation of the robot.

* * * * *